United States Patent
Li et al.

(10) Patent No.: US 10,572,071 B2
(45) Date of Patent: *Feb. 25, 2020

(54) WAVEGUIDE-BASED TOUCH SYSTEM EMPLOYING INTERFERENCE EFFECTS

(71) Applicant: Corning Incorporated, Corning, NY (US)

(72) Inventors: Ming-Jun Li, Horseheads, NY (US); Daniel Aloysius Nolan, Corning, NY (US); Wendell Porter Weeks, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/916,924

(22) Filed: Mar. 9, 2018

(65) Prior Publication Data
US 2018/0196577 A1    Jul. 12, 2018

Related U.S. Application Data

(62) Division of application No. 13/867,417, filed on Apr. 22, 2013, now Pat. No. 9,952,719.

(Continued)

(51) Int. Cl.
*G09G 1/00* (2006.01)
*G06F 3/042* (2006.01)
(Continued)

(52) U.S. Cl.
CPC ............ *G06F 3/0421* (2013.01); *G06F 3/044* (2013.01); *G06F 3/045* (2013.01); *G06F 2203/04105* (2013.01)

(58) Field of Classification Search
CPC .......... G06F 3/016; G06F 3/042; G09G 3/36; G09G 3/3614; G09G 2330/021
See application file for complete search history.

(56) References Cited

U.S. PATENT DOCUMENTS

| | | | |
|---|---|---|---|
| 3,673,327 A | 6/1972 | Johnson et al. | |
| 4,484,179 A | 11/1984 | Kasday | |

(Continued)

FOREIGN PATENT DOCUMENTS

| | | |
|---|---|---|
| EP | 901229 B1 | 6/2007 |
| EP | 2392904 A2 | 6/2011 |

(Continued)

OTHER PUBLICATIONS

U.S. Appl. No. 61/564,003, filed Nov. 28, 2011.
(Continued)

*Primary Examiner* — Michael A Faragalla

(57) ABSTRACT

A touch system that employs interference effects is disclosed. The touch system includes first and second waveguides that have first and second optical paths that define an optical path difference. The first and second waveguides are configured so that a touch event deforms at least one of the waveguides in a manner that causes the optical path difference to change. The change in the optical path difference is detected by combining the light traveling in the two waveguides to form interfered light. The interfered light is processed to determine the occurrence of a touch event. The time-evolution of the deformation at the touch-event location can also be determined by measuring the interfered light over the duration of the touch event.

26 Claims, 17 Drawing Sheets

Related U.S. Application Data

(60) Provisional application No. 61/651,136, filed on May 24, 2012.

(51) Int. Cl.
*G06F 3/044* (2006.01)
*G06F 3/045* (2006.01)

(56) References Cited

U.S. PATENT DOCUMENTS

| | | |
|---|---|---|
| 4,511,760 A | 4/1985 | Garwin et al. |
| 4,542,375 A | 9/1985 | Alles et al. |
| 4,687,885 A | 8/1987 | Talmage, Jr. et al. |
| 4,710,760 A | 12/1987 | Kasday |
| 4,725,978 A | 2/1988 | Fujioka |
| 4,733,068 A | 3/1988 | Thiele et al. |
| 4,834,480 A | 5/1989 | Baker et al. |
| 4,974,933 A | 12/1990 | Ainslie et al. |
| 5,035,734 A | 7/1991 | Honkanen et al. |
| 5,222,400 A | 6/1993 | Hilton |
| 5,295,205 A | 3/1994 | Miller et al. |
| 5,351,325 A | 9/1994 | Miller et al. |
| 5,446,480 A | 8/1995 | Yoshida |
| 5,610,629 A | 3/1997 | Baur |
| 5,712,937 A | 1/1998 | Asawa et al. |
| 5,943,458 A | 8/1999 | Miller |
| 6,031,520 A | 2/2000 | De Gotari |
| 6,084,571 A | 7/2000 | De Gotari |
| 6,326,948 B1 | 12/2001 | Kobachi et al. |
| 6,504,530 B1 | 1/2003 | Wilson et al. |
| 6,556,149 B1 | 4/2003 | Reimer et al. |
| 6,788,295 B1 | 9/2004 | Inkster |
| 6,804,012 B2 | 10/2004 | Gombert |
| 6,816,537 B2 | 11/2004 | Liess |
| 6,862,396 B2 | 3/2005 | Dickson et al. |
| 6,900,795 B1 | 5/2005 | Knight, III et al. |
| 7,042,371 B2 | 5/2006 | Tervonen et al. |
| 7,157,649 B2 | 1/2007 | Hill |
| 7,158,054 B2 | 1/2007 | Pihlaja |
| 7,417,627 B2 | 8/2008 | Cok |
| 7,465,914 B2 | 12/2008 | Eliasson et al. |
| 7,515,140 B2 | 4/2009 | Philipp |
| 7,666,511 B2 | 2/2010 | Ellison et al. |
| 7,685,538 B2 | 3/2010 | Fleck et al. |
| 7,786,978 B2 | 8/2010 | Lapstun et al. |
| 7,805,036 B2 | 9/2010 | Juni |
| 7,903,090 B2 | 3/2011 | Soss et al. |
| 7,920,124 B2 | 4/2011 | Tokita et al. |
| 8,049,739 B2 | 11/2011 | Wu et al. |
| 8,075,999 B2 | 12/2011 | Barefoot et al. |
| 8,120,595 B2 | 2/2012 | Kukulj et al. |
| 8,130,210 B2 | 3/2012 | Saxena et al. |
| 8,158,543 B2 | 4/2012 | Dejneka et al. |
| 8,179,375 B2 | 5/2012 | Ciesla et al. |
| 8,187,987 B2 | 5/2012 | Amin et al. |
| 8,253,712 B2 | 8/2012 | Klinghult |
| 8,325,158 B2 * | 12/2012 | Yatsuda ............ B29D 11/00663 345/176 |
| 8,368,677 B2 | 2/2013 | Yamamoto |
| 8,378,975 B2 | 2/2013 | Yoon et al. |
| 8,390,481 B2 | 3/2013 | Pance et al. |
| 8,395,601 B2 | 3/2013 | Nho et al. |
| 8,411,068 B2 | 4/2013 | Lu et al. |
| 8,553,014 B2 | 10/2013 | Holmgren et al. |
| 8,674,963 B2 | 3/2014 | Cornish et al. |
| 9,274,600 B2 | 3/2016 | Anastas et al. |
| 9,405,382 B2 | 8/2016 | Drumm et al. |
| 2001/0007449 A1 | 7/2001 | Kobachi et al. |
| 2002/0154250 A1 | 10/2002 | An |
| 2003/0026971 A1 | 2/2003 | Inkster et al. |
| 2006/0096392 A1 | 5/2006 | Inkster et al. |
| 2007/0201042 A1 | 8/2007 | Eliasson et al. |
| 2007/0211985 A1 | 9/2007 | Duer |
| 2008/0068343 A1 | 3/2008 | Hoshino et al. |
| 2008/0088597 A1 | 4/2008 | Prest et al. |
| 2008/0088600 A1 | 4/2008 | Prest et al. |
| 2008/0252619 A1 | 10/2008 | Crockett et al. |
| 2008/0284742 A1 | 11/2008 | Prest et al. |
| 2008/0284925 A1 | 11/2008 | Han |
| 2008/0289884 A1 | 11/2008 | Elwell |
| 2008/0303797 A1 | 12/2008 | Grothe |
| 2009/0015564 A1 | 1/2009 | Ye et al. |
| 2009/0124024 A1 | 5/2009 | Kasai et al. |
| 2009/0219253 A1 | 9/2009 | Izadi et al. |
| 2009/0219261 A1 | 9/2009 | Jacobson et al. |
| 2009/0322677 A1 | 12/2009 | Lee et al. |
| 2010/0001978 A1 | 1/2010 | Lynch et al. |
| 2010/0060548 A1 | 3/2010 | Choi et al. |
| 2010/0079264 A1 | 4/2010 | Hoellwarth |
| 2010/0103123 A1 | 4/2010 | Cohen et al. |
| 2010/0103140 A1 | 4/2010 | Hansson |
| 2010/0117974 A1 | 5/2010 | Joguet et al. |
| 2010/0117989 A1 | 5/2010 | Chang |
| 2010/0141557 A1 | 6/2010 | Gruhlke et al. |
| 2010/0156847 A1 | 6/2010 | No et al. |
| 2010/0171717 A1 | 7/2010 | Hu et al. |
| 2010/0207906 A1 | 8/2010 | Anglin et al. |
| 2010/0245288 A1 | 9/2010 | Harris |
| 2010/0253650 A1 | 10/2010 | Dietzel et al. |
| 2010/0302185 A1 * | 12/2010 | Han .................. G06F 3/042 345/173 |
| 2010/0321310 A1 | 12/2010 | Kim et al. |
| 2010/0328270 A1 | 12/2010 | Lin et al. |
| 2011/0012867 A1 | 1/2011 | Lee |
| 2011/0032214 A1 | 2/2011 | Gruhlke et al. |
| 2011/0122091 A1 | 5/2011 | King et al. |
| 2011/0141053 A1 | 6/2011 | Bulea et al. |
| 2011/0157092 A1 | 6/2011 | Yang |
| 2011/0169782 A1 | 7/2011 | Goertz et al. |
| 2011/0298742 A1 | 12/2011 | Dingnan |
| 2012/0068939 A1 | 3/2012 | Pemberton-Pigott |
| 2012/0068970 A1 * | 3/2012 | Pemberton-Pigott ...................... G06F 3/016 345/175 |
| 2012/0068971 A1 | 3/2012 | Pemberton-Pigott |
| 2012/0071206 A1 | 3/2012 | Pemberton-Pigott |
| 2012/0092250 A1 | 4/2012 | Hadas et al. |
| 2012/0098795 A1 | 4/2012 | Lu et al. |
| 2012/0176345 A1 | 7/2012 | Ye et al. |
| 2012/0212451 A1 | 8/2012 | Large et al. |
| 2012/0242607 A1 | 9/2012 | Ciesla et al. |
| 2012/0326981 A1 | 12/2012 | Kurose |
| 2013/0107306 A1 | 5/2013 | Yoon et al. |
| 2013/0135254 A1 | 5/2013 | Lee et al. |
| 2014/0035836 A1 | 2/2014 | Cui et al. |
| 2014/0055421 A1 | 2/2014 | Christiansson et al. |

FOREIGN PATENT DOCUMENTS

| | | |
|---|---|---|
| EP | 2437144 A1 | 4/2012 |
| EP | 2437145 A1 | 4/2012 |
| EP | 2439619 A1 | 4/2012 |
| EP | 2439620 A1 | 4/2012 |
| FR | 2963839 A1 | 2/2012 |
| GB | 2313195 A | 5/1996 |
| WO | 1983003314 A1 | 9/1983 |
| WO | 2002035460 A1 | 5/2002 |
| WO | 2010063320 A1 | 6/2010 |
| WO | 2011111033 A1 | 9/2011 |
| WO | 2012027599 A2 | 3/2012 |
| WO | 2012087286 A1 | 6/2012 |
| WO | 2013029641 A1 | 3/2013 |
| WO | 2013037385 A1 | 3/2013 |
| WO | 2013068651 A2 | 5/2013 |

OTHER PUBLICATIONS

U.S. Appl. No. 61/564,024, filed Nov. 28, 2011.
U.S. Appl. No. 61/640,605, filed Apr. 30, 2012.
Nolan, "Multiply Tapered Fiber Devices" OSA/WDM Components 1999, vol. 29, pp. 95-100.
Pochi, "Optical waves in layered media," A Wiley Interscience Publication, Sysmetrical Slabe Waveguides, p. 299-318.

(56) References Cited

OTHER PUBLICATIONS

Vassallo "Optical Waveguide Concepts" Chapter 5.2: Bent Waveguides, Elsevier 1991, p. 228-231.

* cited by examiner

WAVEGUIDE-BASED TOUCH SYSTEM EMPLOYING INTERFERENCE EFFECTS

CROSS-REFERENCE TO RELATED APPLICATIONS

This application is a Divisional of U.S. patent application Ser. No. 13/867,417 filed on Apr. 22, 2013, which claims the benefit of priority under 35 U.S.C. § 119 of U.S. Provisional Application Ser. No. 61/651,136 filed on May 24, 2012, the content of each are relied upon and incorporated herein by reference in its entirety.

FIELD

The present disclosure relates to touch-sensitive devices, and in particular to touch systems that employ interference effects.

BACKGROUND ART

The market for displays and other devices (e.g., keyboards) having non-mechanical touch functionality is rapidly growing. As a result, touch-sensing techniques have been developed to enable displays and other devices to have touch functionality. Touch-sensing functionality is gaining wider use in mobile device applications, such as smart phones, e-book readers, laptop computers and tablet computers.

Touch systems in the form of touch screens have been developed that respond to a variety of types of touches, such as single touches, multiple touches, swiping, and touches. Some of these systems rely on light-scattering and/or light attenuation. While effective, there remains a need for alternative optics-based approaches to touch-sensing that can provide the required sensitivity to sense one or more touch events and to determine the locations of the one or more touch events.

SUMMARY

A touch system that employs optical interference effects is disclosed. The touch system includes first and second waveguides that have first and second optical paths that define an optical path difference between a light source and a detector. The first and second waveguides are configured so that a touch event deforms at least one of the waveguides in a manner that causes the optical path difference to change. The change in the optical path difference ("optical path change") is detected by combining the light traveling in the two waveguides to form interfered light. The interfered light is processed to determine the occurrence of a touch event. The time-evolution of the deformation of at least one of the waveguides at the touch-event location can also be determined by measuring the interfered light over the duration of the touch event.

Aspects of the disclosure include forming an array of optical interferometers that can sense a touch event by being sensitive to optical path changes caused by deforming at least one arm of the interferometer. The interferometers are waveguide based and are defined by a waveguide assembly that includes first and second waveguides that define first and second interferometer arms.

A network of the waveguide-based interferometers can be used to provide touch-sensing capability over an area of the touch-screen system. Optical fibers, and in particular dual-core optical fibers or like fiber configurations, can be used to define the interferometer arms. The interferometers can be configured as Mach-Zehnder interferometers and in particular unbalanced Mach-Zehnder interferometers. The waveguides can have graded-index or step-index profiles that either support a single guided mode or multiple guided modes. In an example, only the lowest-order guided mode is used to define the optical path for the given waveguide. The waveguides can be supported by a support substrate or can be separated by an air gap. The support substrate can be transparent or opaque, and can be somewhat flexible or pliable to facilitate localized bending of one or both waveguides.

In examples, only one of the waveguide deforms when the waveguide assembly is subjected to a touch event. In other examples, both waveguides deform.

In an example, a detection grid is formed using the waveguides to enable (x,y) detection of the touch event location. This has particular utility for touch-sensitive systems such as keyboards that operate based on pressure being applied to a select location on a touch screen. The grid can be formed in one example using crossed arrays of dual-core optical fibers. Such a grid can constitute a network of optical interferometers, which each interferometer generating an interferometer signal. The interferometer signals can be processed by a controller to establish the location as well as the amount of force (e.g., the relative amount of force or pressure) applied at a touch event locations.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. Patent Application Publication No. 2011/0122091 and U.S. Provisional Patent Applications Nos. 61/564,003, 61/564,024 and 61/640,605.

Figure 1:
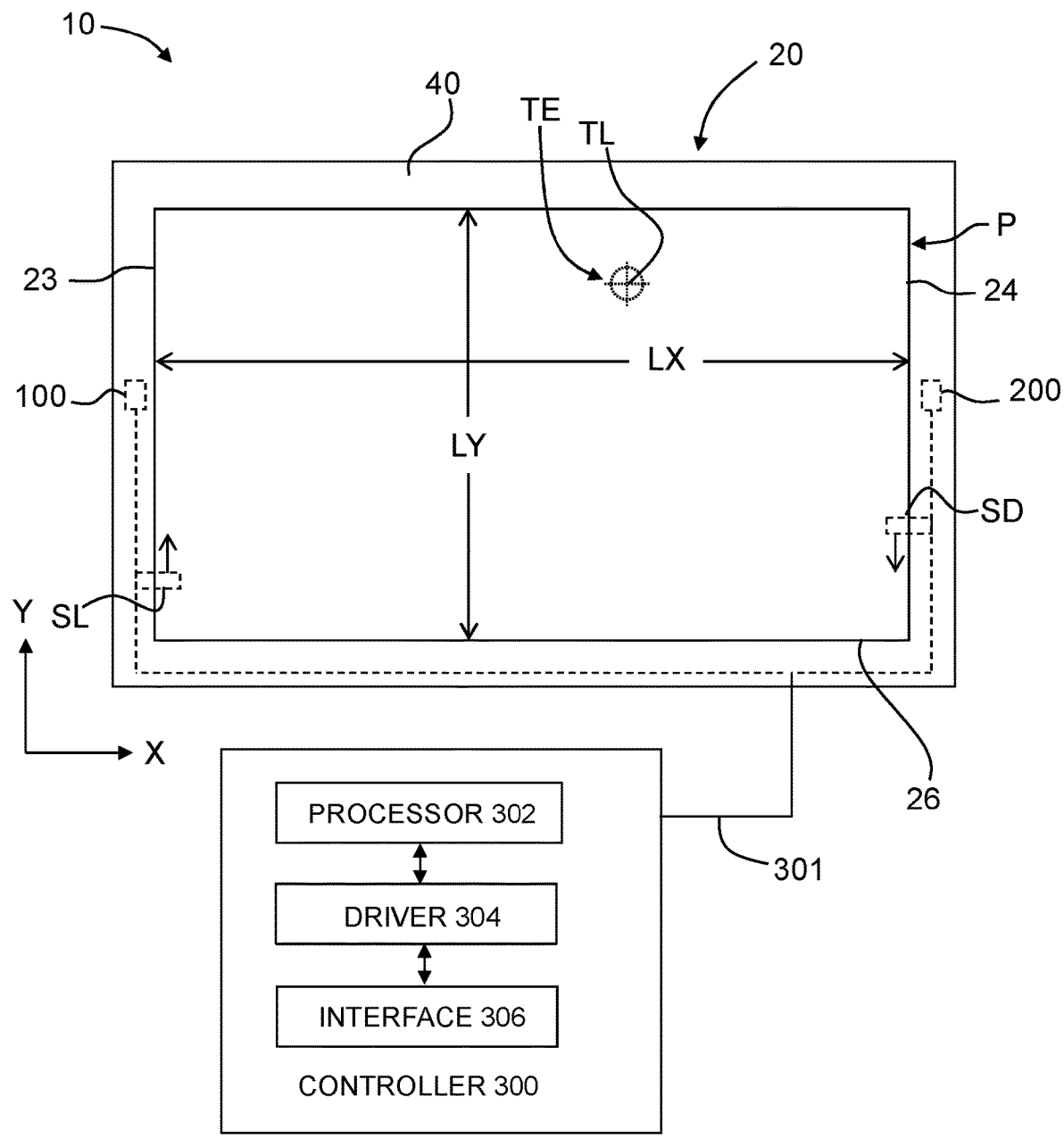
FIG. 1 is a face-on view of an example touch system according to the disclosure.

Cartesian coordinates are shown in certain of the Figures for the sake of reference and are not intended as limiting with respect to direction or orientation.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Touch System

FIG. 1 is a schematic diagram of an example touch system 10 (also referred to as a "touch-screen system") according to the disclosure. The touch system 10 may be used in a variety of consumer electronic articles, for example, in conjunction with displays for cell-phones, keyboards, touch screens and other electronic devices such as those capable of wireless communication, music players, notebook computers, mobile devices, game controllers, computer "mice," electronic book readers and the like.

The example touch system 10 of FIG. 1 includes a generally planar light-guiding assembly ("assembly") 20, the details of which are described in greater detail below. At least one light source 100 and at least one detector 200 are disposed adjacent a perimeter P of the assembly and are optically coupled through waveguides of the assembly as explained in greater detail below. One light source 100 and one detector 200 are shown by way of example. Perimeter P includes an edge (end) 23 adjacent light source 100 and an edge (end) 24 adjacent detector 200. Perimeter P can have any reasonable shape and is shown as being rectangular by way of example. Assembly 20 can be rectangular and in the example shown has a dimension (length) LX in the X-direction and a length LY in the Y-direction.

Multiple light-sources 100 can be used (or equivalently, a light source with multiple light-source elements can be used), and multiple detectors 200 can be used (or equivalently, a detector with multiple detector elements, especially when the location of one or more touch events needs to be determined. In addition, one or more light sources 100 and one or more detectors 200 can be operably disposed in the assembly to ensure that the entire (or substantially the entire) assembly can be used to sense the pressure of a touch event. This may include, for example, cycling the activation of sets (e.g., pairs) of light sources 100 and/or detectors 200 to ensure that all possible locations for touch events are covered. In an example, the cycling can be done at a rate that is much faster than the typical duration of a touch event that applies pressure to elicit a response from touch system 10.

Example detectors 200 include photodiodes and the various types of photosensors. Example light sources 100 include LEDs, laser diodes, optical-fiber-based lasers, extended light sources, and the like.

Figure 2A:
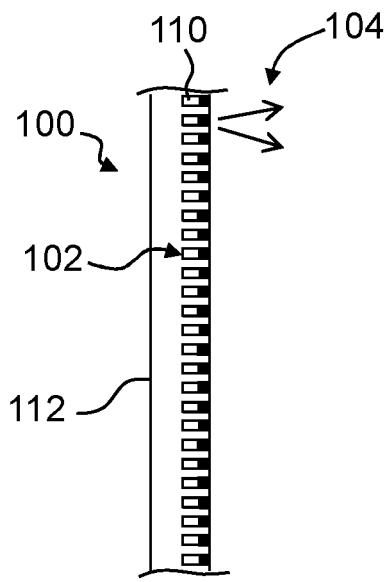
FIGS. 2A and 2B are top-down views of an example light source that includes multiple light-source elements (FIG. 2A) and an example detector that includes multiple detector elements (FIG. 2B)
Figure 2B:
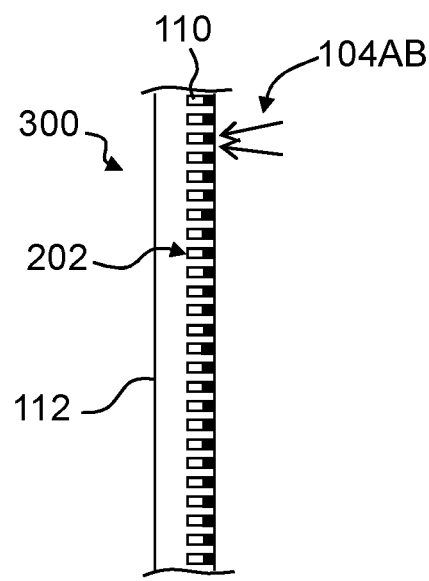

With reference to FIG. 2A, light source 100 can comprise one or more light-source elements 102 that are operably mounted on flex-circuit boards ("flex circuits") 110, which in turn are mounted to printed circuit boards (PCB) 112 arranged adjacent an edge 26 of transparent sheet 20. In the discussion herein, light source 100 can thus mean a light source having one or more light-source elements 102. Likewise, with reference to FIG. 2B, detector 200 can include a detector that has one more detector elements 202. Interfered light 104AB is shown incident upon one of detector elements 202.

In example embodiments of the disclosure, an amount of pressure (e.g., a relative amount of pressure) is applied to planar light-guiding assembly at touch location TL associated with a touch event TE. Aspects of the disclosure are directed to sensing the occurrence of a touch event TE, while other aspects include the additional function of determining the touch location TL of the touch event. Other aspects of the disclosure include sensing the occurrence of multiple touch events TE and optionally determining the touch locations TE of the touch events. Other aspects of the disclosure include sensing both the amount of pressure applied and determining the touch location TL of a touch event TE.

Figure 15A:
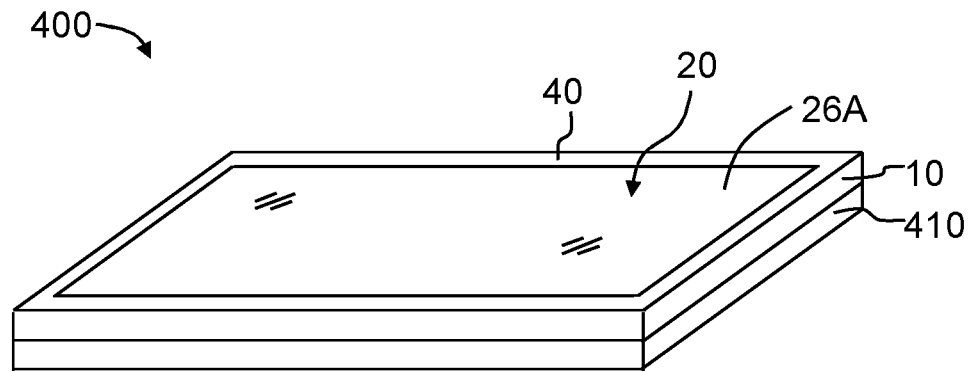
FIG. 15A is an elevated view of an example display system formed by operably arranging the touch system disclosed herein adjacent and above (e.g., atop) a conventional display unit.
Figure 15B:
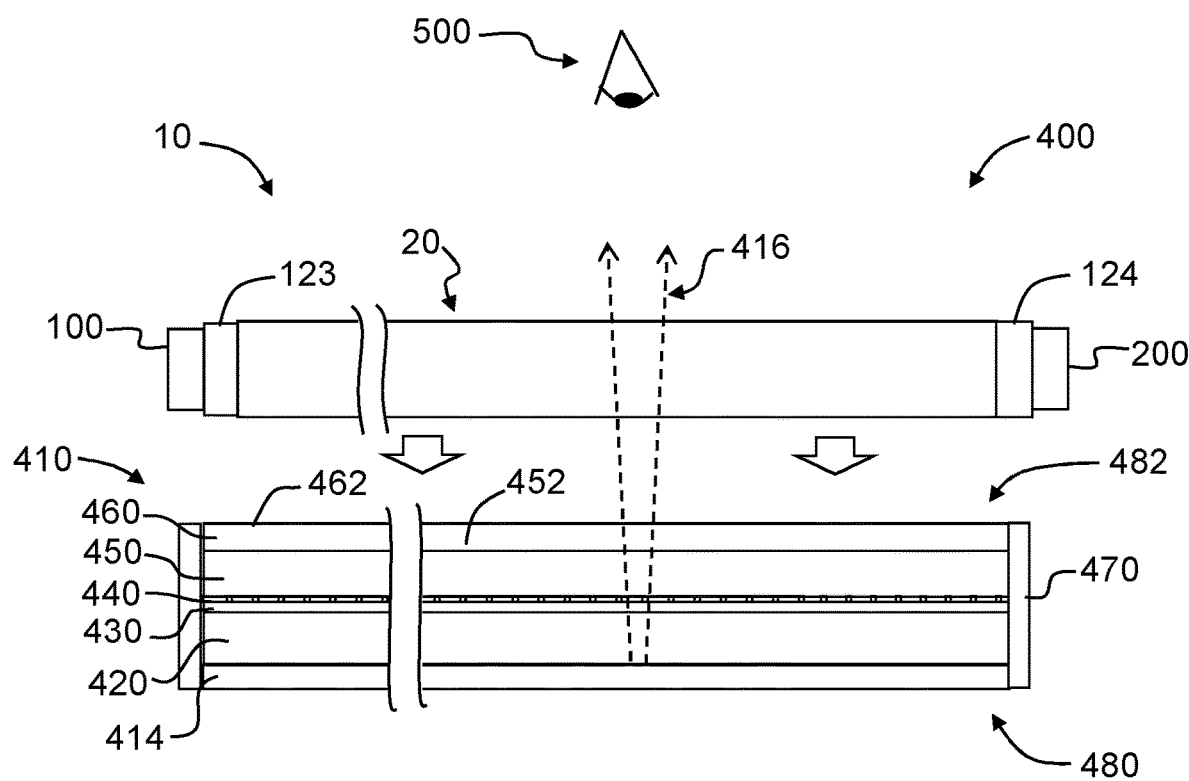
FIG. 15B is a more detailed cross-sectional view of the example display system formed by combining the touch system with the conventional display.

In an example, touch system 10 includes an optional cover 40 that serves to cover light source 100 and 200 so that they cannot be seen from above assembly 20 by a viewer (see, e.g., viewer 500, FIG. 15B). In an example, cover 40 serves the role of a bezel. In an example, cover 40 can be any type of light-blocking member, film, paint, glass, component, material, texture, structure, etc. that serves to block at least visible light and that is configured to keep some portion of touch system 10 from being viewed by a user, or that blocks one wavelength of light while transmitting another.

In example embodiments, cover 40 can reside anywhere relative to assembly 20 that serves to block a viewer from seeing light source 100 or detector 200. Cover 40 need not be contiguous and can be made of sections or segments. Further, cover 40 can be used to shield detector 200 from receiving light other than light 104 from light source 100, such as for sunlight rejection. Thus, in an example, cover can be substantially opaque at one wavelength (e.g., a visible wavelength) and substantially transparent at another wavelength (e.g., an infrared wavelength for light 104 from light source 100).

In an example, cover 40 is in the form of a film that is opaque at least at visible wavelengths and that optionally transmits at IR wavelengths. An example film for cover 40 comprises a black paint that absorbs light over a wide range of wavelengths including the visible and IR wavelengths.

With continuing reference to FIG. 1, touch system 10 may include a controller 300 that is operably connected (e.g., via a bus 301) to the one or more light sources 100 and the one or more detectors 200. Controller 300 is configured to control the operation of touch system 10. In some embodiments, the controller 300 includes a processor 302, a device driver 304 and interface circuit 306, all operably arranged. Controller controls light source 100 via a light-source signal SL and also receives and processes a detector signal SD from detector 200.

In an example, controller 300 comprises a computer and includes a device, for example, a floppy disk drive, CD-ROM drive, DVD drive, magnetic optical disk (MOD) device (not shown), or any other digital device including a network connecting device such as an Ethernet device (not shown) for reading instructions and/or data from a computer-readable medium, such as a floppy disk, a CD-ROM, a DVD, a MOD or another digital source such as a network or the Internet, as well as yet to be developed digital means. The computer executes instructions stored in firmware and/or software (not shown).

The computer is programmable to perform functions described herein, including the operation of the touch system and any signal processing that is required to measure, for example, relative amounts of pressure, as well as the location of a touch event, or multiple touch events and multiple pressures. As used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the pressure-sensing functions and operations disclosed herein. The software may be operably installed in controller 300 or processor 302. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

The computer and/or processor as discussed below may each employ a computer-readable medium or machine-readable medium, which refers to any medium that participates in providing instructions to a processor for execution, including for example, determining an amount of pressure associated with a touch event, as explained below. Any memory discussed below constitutes a computer-readable medium. Such a medium may take many forms, including but not limited to, non-volatile media, volatile media, and transmission media. Non-volatile media include, for example, optical or magnetic disks, such as any of the storage devices in any computer(s) operating as one of the server platforms, discussed above. Volatile media include dynamic memory, such as main memory of such a computer platform. Physical transmission media include coaxial cables; copper wire and fiber optics, including the wires that comprise a bus within a computer system.

Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Light-Guiding Assembly

Figure 3:
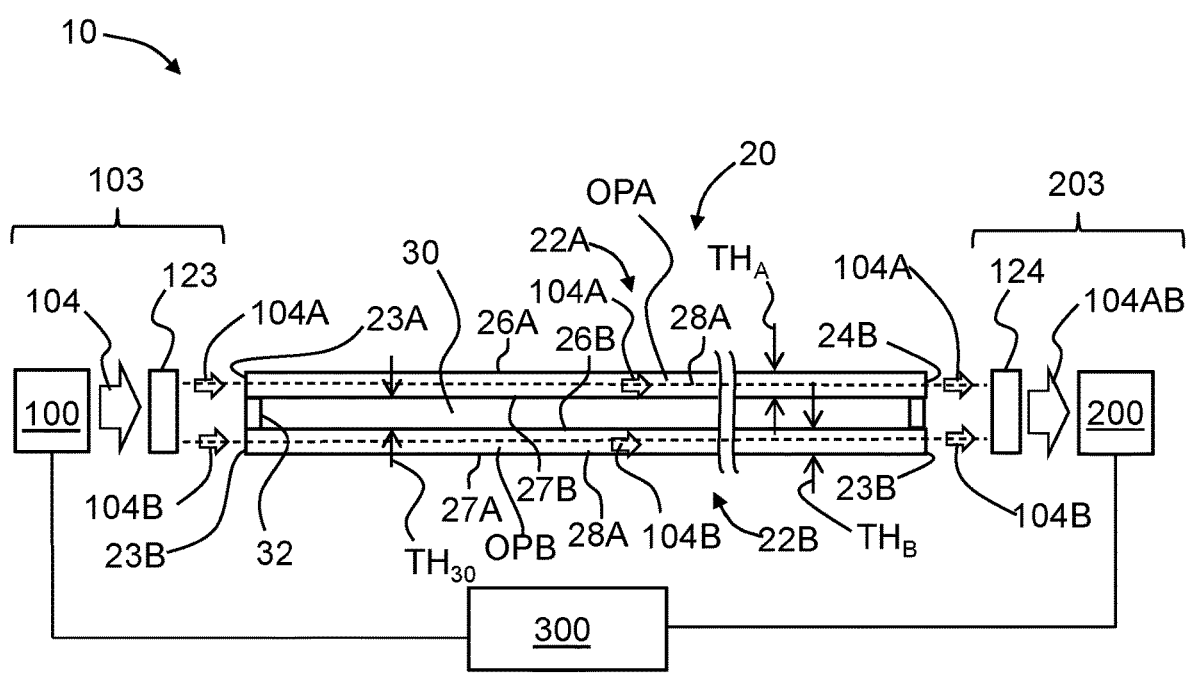
FIG. 3 is a cross-sectional view of an example embodiment of a light-guiding assembly for the touch system of FIG. 1.

FIG. 3 is a cross-sectional view of example system 10 that includes an example embodiment of assembly 20. Assembly 20 includes a top optical waveguide ("top waveguide") 22A and a bottom optical waveguide ("bottom waveguide") 22B. Top and bottom waveguides 22A and 22B have respective input edges 23A, 23B adjacent light source 100 and respective output edges 24A and 24B adjacent detector 200. The top and bottom waveguides 22A and 22B also have respective bodies 25A and 25B that are substantially transparent to the wavelength of light 104 emitted by light source 100. Top and bottom waveguides 22A and 22B also have respective upper surfaces 26A and 26B, and respective lower surfaces 27A and 27B that are defined by respective bodies 28A and 28B.

In an example embodiment, the lower surface 27A of top waveguide 22A and the upper surface 26A of lower waveguide 22B are spaced apart by a gap 30. In one example, gap 30 is filled with a solid material while in another example is filled with air. Solid materials may comprise low index, transparent, low modulus, and/or high elasticity materials that have limited absorption of the evanescent wave. Gap 30 has a thickness $TH_{30}$ that in an example can range from 0 microns (i.e., no gap) to about 2 mm. In an example, gap 30 is formed by spacers 32. Other thickness $TH_{30}$ for gap 30 are possible depending on the particular application for assembly 20.

In an example, top and bottom waveguides 22A and 22B are defined by first and second transparent and generally planar glass sheets. In other embodiments, materials other than glass can be used, such as polymers, plastics and other non-glass materials that are substantially transparent at the wavelength of light 104.

System 100 includes an input optical system 123 operably arranged between light source 100 and input edges 23A and 23B of top and bottom waveguides 22A and 22B. System 100 also includes an output optical system 124 operably arranged between light source 100 and output edges 24A and 24B of top and bottom waveguides 22A and 22B. Input optical system is configured to receive (coherent) light 104 from light source 100 form therefrom collimated (coherent) light beams 104A and 104B, and to direct these light beams into top and bottom waveguides 22A and 22B, respectively. Light beams 104A and 104B travel through top and bottom waveguides 22A and 22B over respective optical paths OPA and OPB to output edges 24A and 24B. Optical paths OPA and OPB are separate optical paths within top and bottom waveguides respectively, i.e., light beams 104A and 104B do not overlap with each other as they travel through their respective waveguides.

Output optical system 124 is configured to receive the light beams 104A and 104B that exit respective output edges 24A and 24B and combine the beams so that they interfere, thereby forming an interfered light beam 104AB. The interfered light beam 104AB is directed to detector 200, which detects the interfered light beam. Generally, top and bottom waveguides can have any reasonable configuration that allows them to guide respective light beams 104A and 104B.

In some embodiments, optical paths OPA and OPB represent the lowest-order mode of the top and bottom waveguides 24A and 24B. Thus, input and output optical systems 123 and 124 can also be referred to as mode conditioners, since they are used to excite and detect a select mode (here, the lowest-order mode) of top and bottom waveguides 24A and 24B. In some embodiments, the optical paths OPA and OPB represent higher modes or a combination of modes.

Top and bottom waveguides 22A and 22B may generally be made of any suitably transparent material that can be formed into a thin planar sheet, such as plastic, acrylic, glass, etc., and that supports the transmission of light beams 104A and 104B within their respective bodies 28A and 28B without substantial loss due to scattering or absorption. In an example embodiment, top and bottom waveguides 22A and 22B have thicknesses $TH_A$ and $TH_B$ such that the waveguides can flex without breaking when pressure is locally applied at top surface 22 at touch location TL. An exemplary range for thickness THA is from 0.3 mm to 0.8 mm, and for THB is from 0.3 to 1.5 mm. In some embodiments, THA is 0.3, 0.4, 0.5, 0.6, 0.7, or 0.8 mm. In some embodiments, THB is 0.3, 0.4, 0.5, 0.6, 0.7, 0.8, 0.9, 1.0, 1.1, 1.2, 1.3, 1.4, or 1.5 mm. Other thickness can be employed consistent with the particular application for touch system 10. In an example, only top waveguide 22A has a thickness that allows it to flex, while bottom waveguide 22B is sufficiently thick or is otherwise rigid that it retains its generally planer configuration even when the top waveguide is subject to a flexing force due to a touch event TE.

In an example embodiment, one or both of top and bottom waveguides may be formed from a chemically strengthened glass, such as a soda-lime-type glass. An example glass for top and bottom waveguides 22A and 22B is an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as waveguiding sheets may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009. An exemplary glass for use herein is Gorilla® glass, from Corning, Incorporated, Corning, N.Y. Also, an exemplary glass, such as low-iron Gorilla® glass or other low-iron ion-exchanged glass, is transparent to IR-wavelength light 104.

The configuration of assembly 20 defines an interferometer wherein top and bottom waveguides 22A and 22B define the two different arms of the interferometer over which light 104A and 104B respectively travel. This, in an example embodiment, interfered light 104AB is formed from light 104A and light 104B that travel through separate (i.e., non-overlapping) optical paths over the two arms of the interferometer. In an example, the interferometer is configured to be unbalanced so that interference occurs at detector 200. This can be accomplished by making optical paths OPA and OPB different from each other, e.g., by having one of top and bottom waveguides 22A and 22B slightly longer than the other. This introduces an initial or first optical path difference $\Delta OPD_1$.

When there is no touch event TE occurring on upper surface 26A of top waveguide 22A, optical paths OPA and OPB remain constant so that the first or initial optical path difference $\Delta OPD_1$ stays the same. When a touch event TE occurs on upper surface 26A of top waveguide 22A, it creates a change in the at least one of optical paths OPA and OPB giving rise to a second optical path difference $\Delta OPD_2$ that causes a change in the interfered light 104AB detected by detector 200.

Figure 4A:
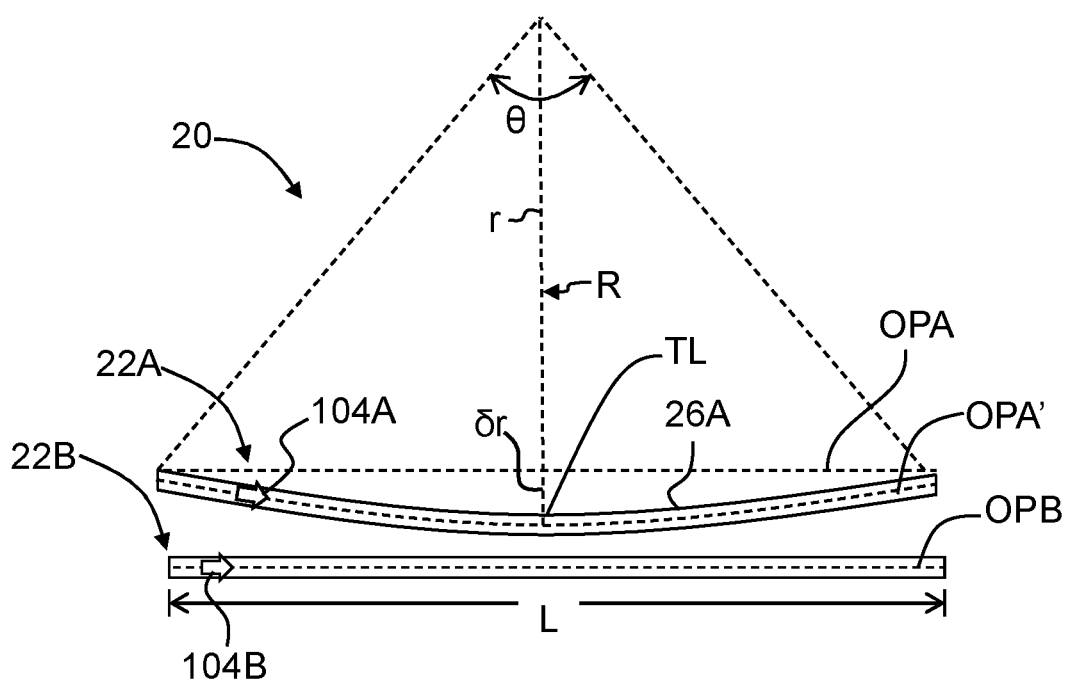
FIGS. 4A and 4B are cross-sectional views of two different example embodiments for the light-guiding assembly showing the relevant parameters that describe a relative change in the optical paths for the top and bottom waveguides, wherein in FIG. 4A only the top waveguide flexes when pressure is applied, and wherein in FIG. 4B both the top and bottom waveguides flex when pressure is applied.

FIG. 4A is a cross-sectional view of top and bottom waveguides 22A and 22B when upper surface 26A is subject to a touch event TE at a touch event location TL that bends the top waveguide. It is assumed that both the top and bottom waveguides have a length L when no touch event TE is occurring. When a touch event TE occurs at touch location TL, top waveguide 22A bends with a radius of curvature R measured relative to a central longitudinal axis of the top waveguide. This is just one bending scenario and other bending scenarios are discussed below.

The new optical path OPA' associated with the flexed top waveguide 22A is longer than the optical path OPA of the unflexed top waveguide. The optical path OPB of bottom waveguide 22B remains substantially unchanged. This is true whether the bending is over the entire length L of top waveguide 22A or whether the bending is more localized.

Assuming that the curvature of top waveguide 22A has a radius of curvature R=r+δr, and that curvature subtends an angle θ, then if θ is a relatively small angle (i.e., R is relatively large, which is a reasonable assumption in the present instance), it can be readily shown that change in the optical path from OPA to OPA' is approximately δr. Thus, the optical path difference between the optical paths OPA' and OPB of the top and bottom waveguides 22A and 22B, which can also be denoted as $\Delta OPD_2$, is about δr. If δr is for example about 2.5 microns, that would be roughly equal to two wavelengths of infrared light of wavelength of 800 microns or so. This amount of optical path difference $\Delta OPD_2$, would manifest itself as a change in the interfered light 104AB, e.g., a change in the amount of optical power due to shifting fringes in the detected portion of the resulting interference pattern.

Figure 4B:
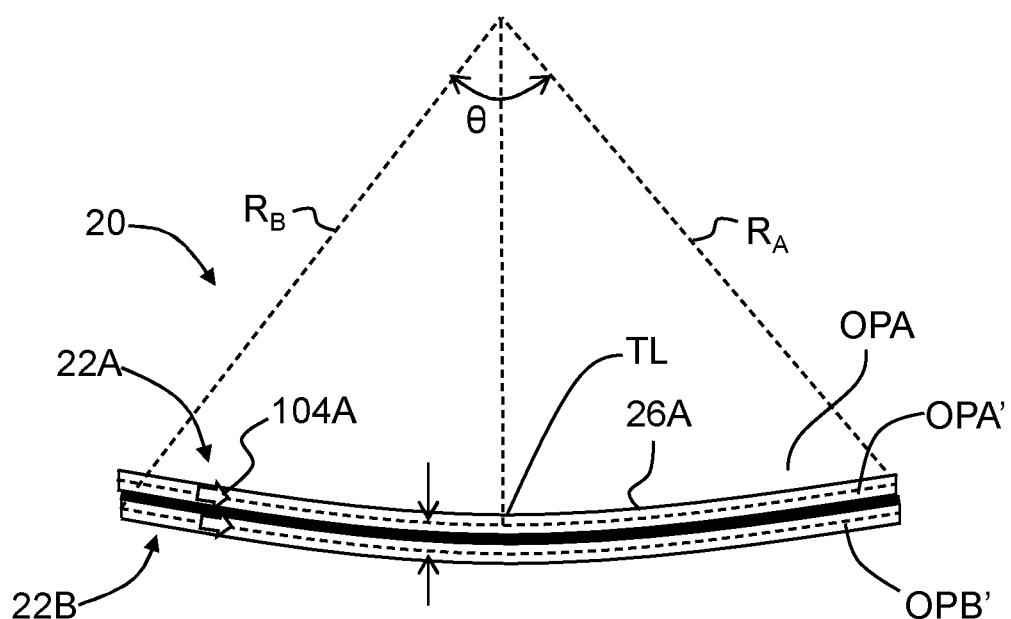

FIG. 4B is similar to FIG. 4A and illustrates an example of assembly 20 where top and bottom waveguides 22A and 22B are separated by a very thin layer 33 of material so that both waveguides flex when subjected to pressure at touch location TL. Top waveguide 22A flexes to have a radius of curvature $R_A$ while bottom waveguide 22B flexes to have a radius of curvature $R_B$. It can be shown that the optical path difference $\Delta OPD_2$ in the optical path lengths OPA' and OPB' associated with the flexed waveguides is approximated by $\theta(R_B - R_A)$. Again, this is true in the case when the bending of the two waveguides is localized.

For θ=1°, R=1 m, and if the center-to-center separation of the guides is $R_B - R_A$=0.5 mm, $\Delta OPD_2$=8.3 microns and the maximum deflection δr=0.15 mm at touch location TL. The nominal length L of the top and bottom waveguides 22A and 22B from their respective input ends 23A, 23B to their respective output ends 24A, 24B is about 17 mm. The values of these parameters are all consistent with being able to interferometrically detect the occurrence of a touch event TE.

Figure 5A:
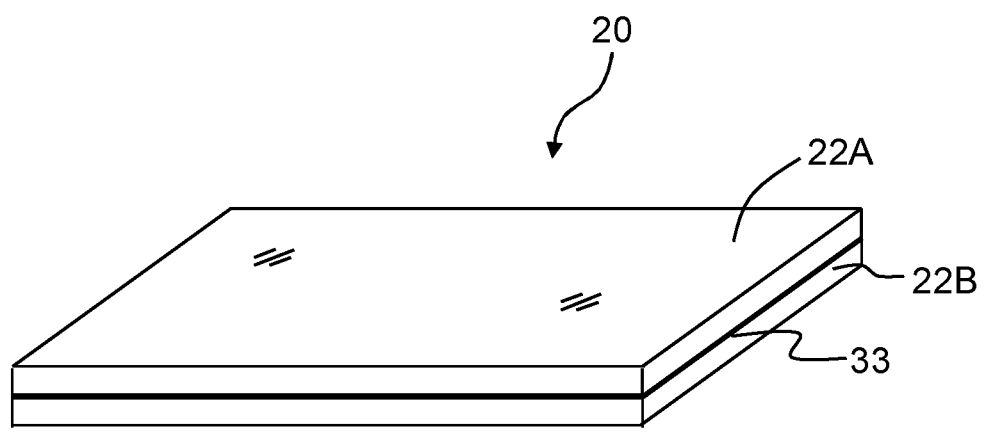
FIG. 5A is an elevated view of an example light-guiding assembly wherein the top and bottom waveguides have a different modulus of elasticity so that the flexing of the assembly is more localized at the touch location of a touch event.

FIG. 5A is an elevated view of an example assembly 20 showing top waveguide 22A, bottom waveguide 22B with layer 33 in between. Layer 33 may be transparent or opaque, or may not be included in assembly 20. Layer 33 may be relatively thin or may be sufficiently thick to constitute a support layer or substrate. In an example, top waveguide 22A is made of a first material having a modulus of elasticity E1 while bottom waveguide 22B is made of a material having a modulus of elasticity E2, wherein E2<E1. This configuration limits the flexing of the combined structure to the location where the force or pressure is applied. Said differently, the radius of curvature of the bending is stronger and more localized.

Figure 5B:
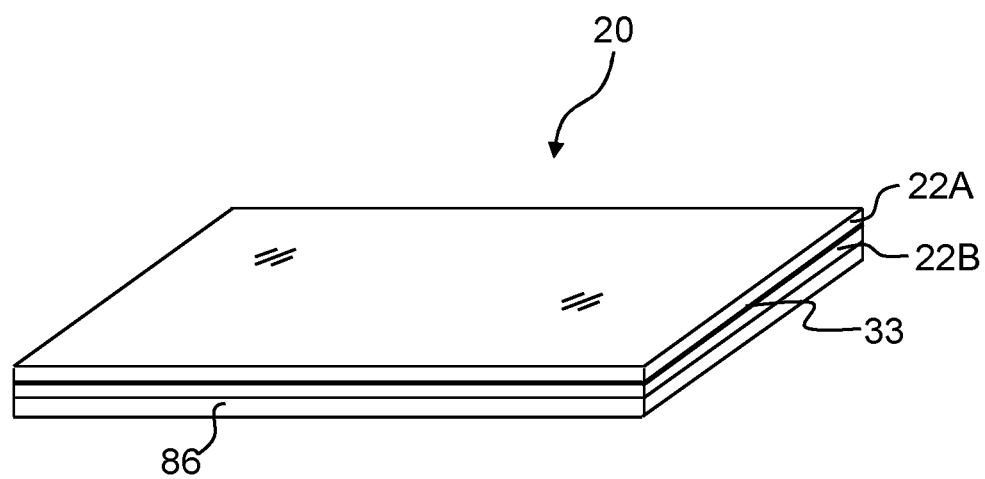
FIG. 5B is similar to FIG. 5A and illustrates an embodiment wherein the light-guiding assembly includes a support structure with a different modulus of elasticity than the top and bottom waveguides.

FIG. 5B is similar to FIG. 5A and illustrates an embodiment of assembly 20 where top and bottom waveguide 22A and 22B each have a modulus of elasticity E1 and are supported on a support substrate 86 having an elastic modulus E2, wherein E2<E1. As with the configuration of FIG. 9A, the configuration of FIG. 8B also limits the flexing of the combined structure to the location where the force or pressure is applied, i.e., the radius of curvature of the bending is stronger and more localized. In an example, top and bottom waveguides 22A and 22B can have a modulus of elasticity E1A and E1B, and the condition E2<E1B<E1A is satisfied.

Figure 5C:
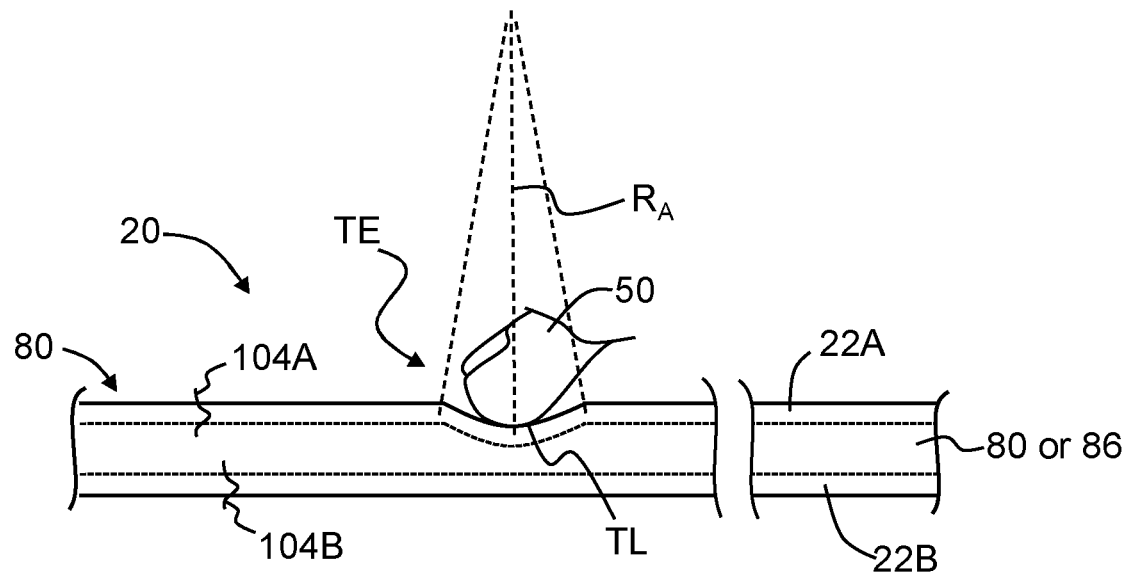
FIGS. 5C and 5D illustrate an example embodiment wherein the curvature of the top waveguide (FIG. 5C) or both the top and bottom waveguides (FIG. 5D) associated with a touch event is relatively localized.
Figure 5D:
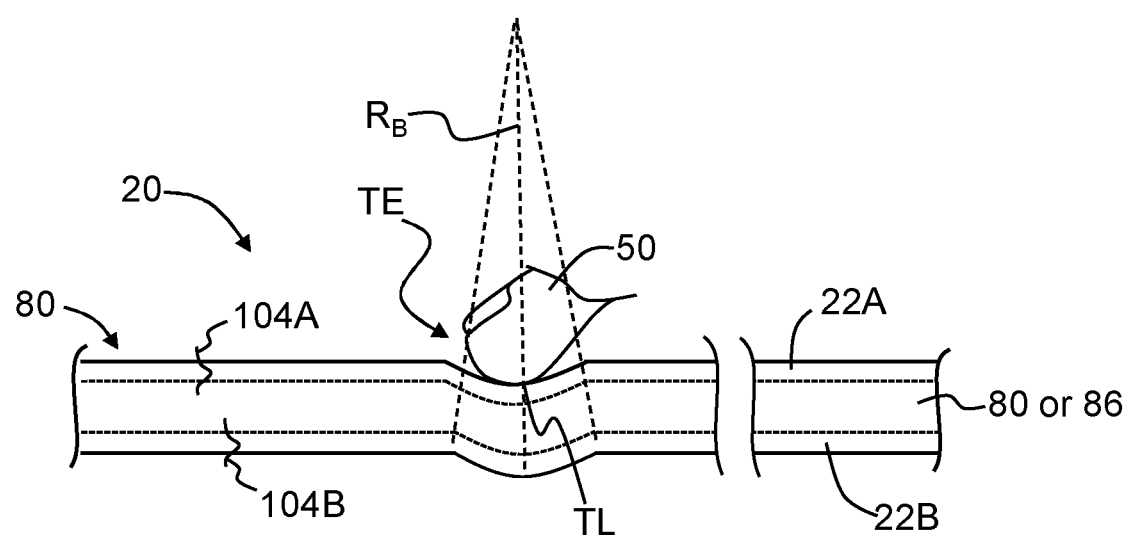

FIGS. 5C and 5D are cross-sectional views of an example assembly 20 wherein top waveguide 22A is sufficiently thin and the underlying support substrate 80 or 86 (i.e., a transparent or an opaque support substrate) is sufficiently flexible so that the touch event TE causes a more localized curvature at the touch event location TL. In FIGS. 5C and 5D, finger 50 is shown as causing touch event TE. Note that the radii of curvature $R_A$ and $R_B$ are smaller than in the case where the bending of the top waveguide (or both of the top and bottom waveguides) occurs over a larger distance.

Figure 6A:
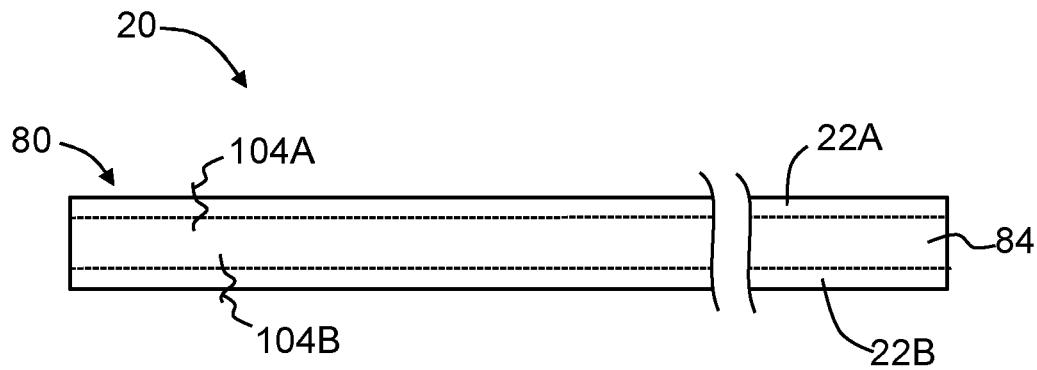
FIG. 6A is a cross-sectional view of an example embodiment of the light-guiding assembly wherein the top and bottom waveguides have a gradient-index formed, for example, by an ion-exchange process.

FIG. 6A is a cross-sectional view of an example embodiment of assembly 20 wherein top and bottom waveguides 22A and 22B are formed in the body 84 of a transparent sheet 80 and have a gradient index. In an example, the gradient-index top and bottom waveguides are formed using an ion-exchange process. The light beams 104A and 104B that respectively travel in top and bottom waveguides 22A and 22B are shown as a fundamental guided mode in each of the gradient-index waveguides.

Figure 6B:
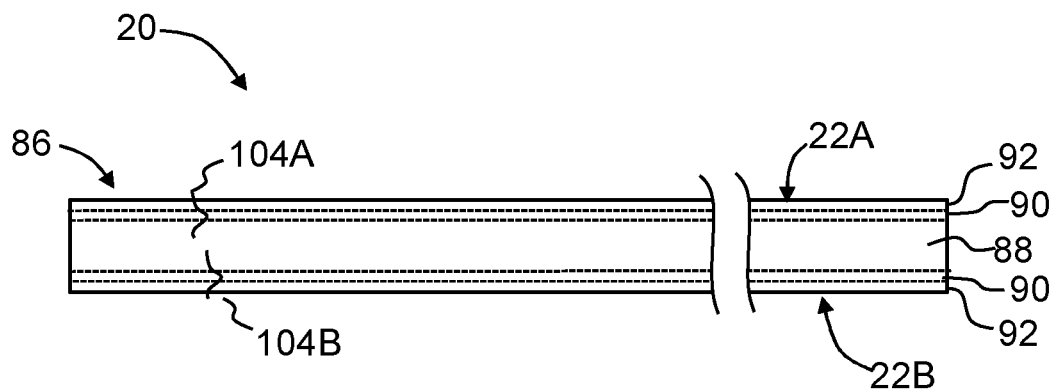
FIG. 6B is similar to FIG. 6A and illustrates an example embodiment wherein the top and bottom waveguides are formed as layered structures on the top and bottom of a glass substrate.
Figure 6C:
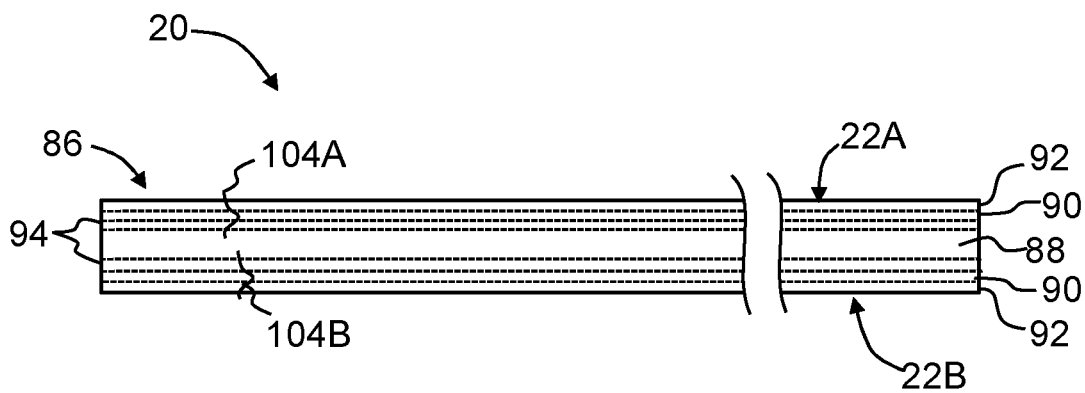
FIG. 6C is similar to FIG. 6B and illustrates an example embodiment wherein the support substrate is opaque and the top and bottom waveguides include an additional cladding layer adjacent the support substrate.

FIG. 6B is similar to FIG. 6A and illustrates an example embodiment wherein the top and bottom waveguides 22A and 22B are formed as layered structures on the top and bottom sides of support substrate 86 that has a body 88 that need not be transparent to the operating wavelength of light. Top and bottom waveguides 22A and 22B are shown as being formed by a high-index core layer 90 that includes a lower-index cladding layer 92 adjacent the core layer. The bulk index of body 88 serves as the cladding layer on the other side of core layer 90. In an example, support substrate 86 is the same as transparent glass sheet 80. In another example, support substrate 86 is made of a flexible material such as plastic, acrylic, thin metal, etc. If body 88 is opaque, then the top and bottom waveguides 22A and 22B each require an additional cladding layer 94 adjacent body 88 of support substrate 86, as illustrated in FIG. 6C.

Touch System Operation

In the general operation of touch system 10, controller 300 via processor 302 drives the activation of light-source 100 via a light-source signal SL and also controls the detection of interfered light 104AB at detector 200. Detector 200 generates detector signal SD in response to detecting interfered light 104AB, wherein the strength of the detector signal SD is representative of the intensity of the detected interfered light. Portions of interface circuit 306 can be placed near detector 200. For example, preamplifiers and analog-to-digital converters (not shown) may be placed near detector 200 to eliminate noise that may be induced in long wires between processor 302 and the detectors 200, particularly when the processor is centrally located.

In an example, processor 302 controls the light emission and detection process to optimize the detection of interfered light 104AB, e.g., by providing a characteristic (e.g., a modulation) to the light 104 from the light-source elements 102, or by gating detectors 200 to reduce noise, etc., or both. The modulation may be wavelength modulation or intensity modulation.

Figure 7A:
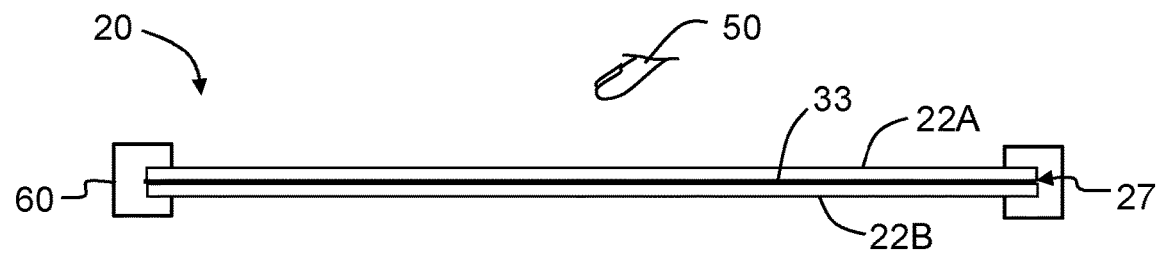
FIG. 7A through FIG. 7C illustrate example light-guiding assemblies, with FIG. 7A showing the assembly prior to a touch event, and FIGS. 7B and 7C showing a touch event occurring at two different touch locations.
Figure 7B:
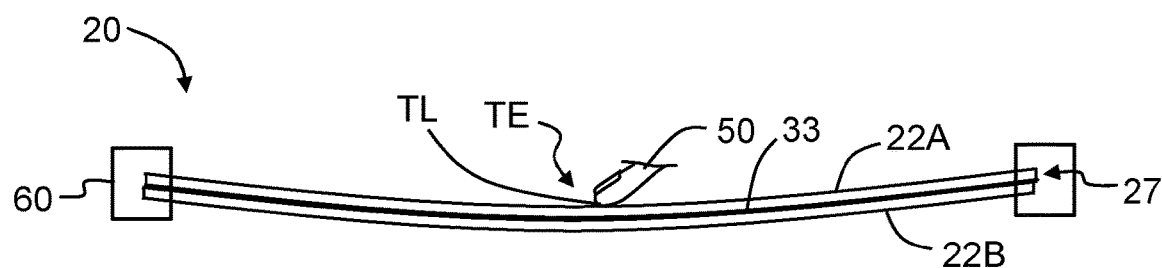
Figure 7C:
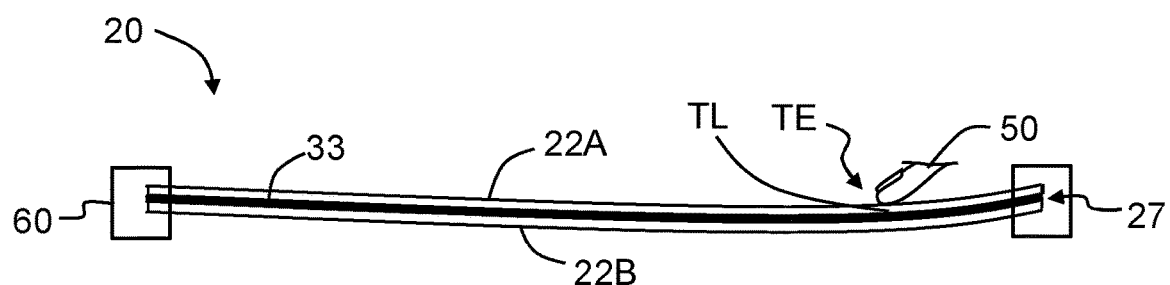

FIGS. 7A through 7C illustrate an example of how a finger 50 is used to create a touch event TE at a touch location TL, with the touch event causing enough pressure to flex top and bottom waveguides 22A and 22B. In the example embodiments shown in FIGS. 7A through 7C, assembly 20 includes a frame 60 at perimeter 27, wherein the frame supports top and bottom waveguides 22A and 22B as well as layer 33 sandwiched between. The flexing of assembly 20 is shown as being gradual. In other embodiment such as those described above in connection with FIGS. 5C and 5D, the bending can be more localized. In an example, the bending can be a combination of localized bending or deformation and a more gradual, larger-scale flexing.

Figure 8A:
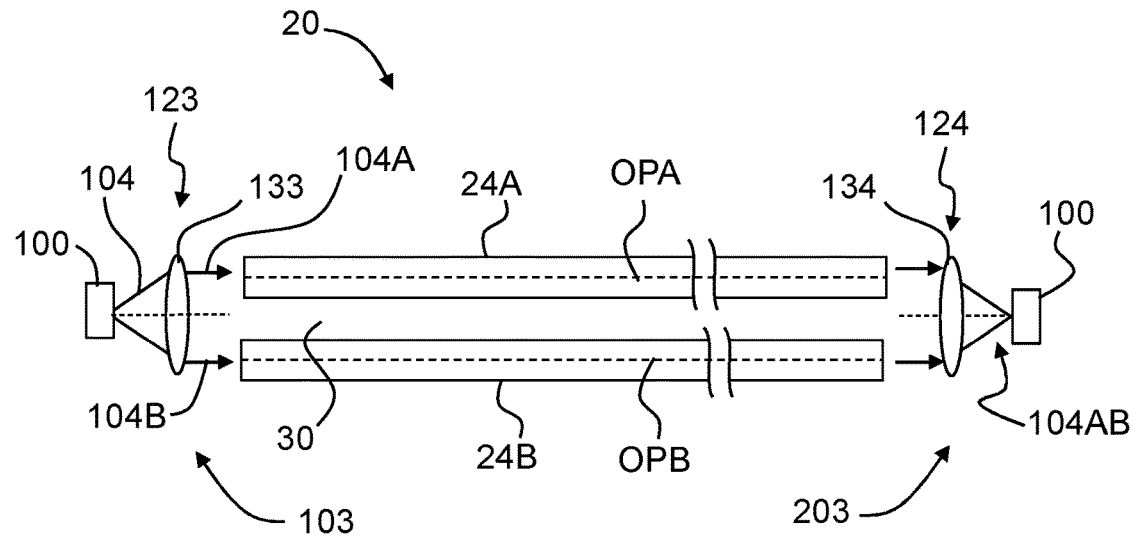
FIG. 8A through 8C illustrate three example embodiments for the light-guiding assembly.

FIG. 8A is a cross-sectional diagram of an example assembly 20 that illustrates an example configuration for input and output optical systems 123 and 124. In the example embodiment shown, input and output optical systems include respective lenses 133 and 134, which can each comprise one or more lenses, lens elements, or other optical elements. Lens 133 is configured to receive diverging light 104 from light source 100 and form collimated light 104A and 104B. Likewise, lens 134 is designed to receive collimated light beams 104A and 104B and focus them to form interfered light 104AB at detector 200. The combination of light source 100 and input optical system 123 defines a light source system 103, while the combination of detector 200 and output optical system 124 defines a detector system 203 (see FIG. 3).

Figure 8B:
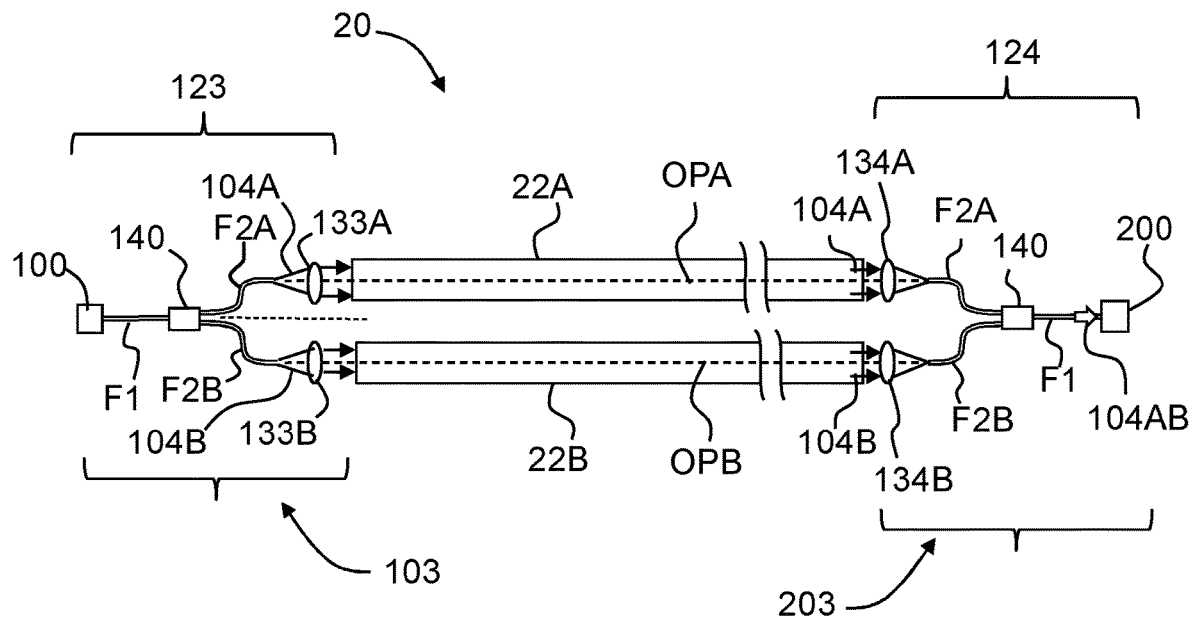

FIG. 8B is similar to FIG. 8A and illustrates an example embodiment where optical fibers are used to configure the input and output optical systems 123 and 124. Input optical system 123 includes a first optical fiber section F1 that is optically connected at one end to light source 100 and at the other end to a fiber optic coupler 140. Fiber optic coupler 140 is also optically coupled to respective ends of two other optical fiber sections F2A and F2B. First and second lenses 133A and 133B are arranged adjacent output ends of optical fiber sections F2A and F2B, respectively. Lenses 133A and 133B may each comprise one or more lenses, lens elements, or other optical elements. Light 104 from light source 100 is carried to coupler 140 by fiber section F1. Coupler 140 serves to split the light between optical fiber sections F2A and F2B so that light beams 104A and 104B respectively travel in these fibers. Lenses 133A and 133B are arranged adjacent the output ends of optical fiber sections F2A and F2B and collimate light 104A and 104B and direct the collimated light into respective top and bottom waveguides 22A and 22B.

At the detector end, output optical system is configured in essentially the same manner but in reverse. Thus, collimated light beams 104A and 104B from top and bottom waveguides 22A and 22B are received by respective lenses 134A and 134B that focus these light beams into respective optical fiber sections F2A and F2B on the detector side. Lenses 134A and 134B may each comprise one or more lenses, lens elements, or other optical elements. Light 104A and 104B travels in these fiber sections to coupler 140, where they are combined to form interfered light beam 104AB. Interfered light beam 104AB then travels in fiber section F1 from coupler 140 to detector 200, which then detects the interfered light beam.

Detector 200 is configured to convert the detected interfered light beam 104AB to an electrical signal embodied by detector signal SD, which in an example is a photocurrent. The detector may be configured to measure signal via a variety of methods, including overall signal intensity, integrated signal intensity, signal intensity at a particular wavelength, signal frequency, changes in signal frequency, etc. The detector electrical signal SD is then sent to processor 302 for processing, as described below. Such processing can be used to extract information relating to changes in the applied pressure at top surface 26A of top waveguide 22A created by touch event TE at touch location TL.

Figure 8C:
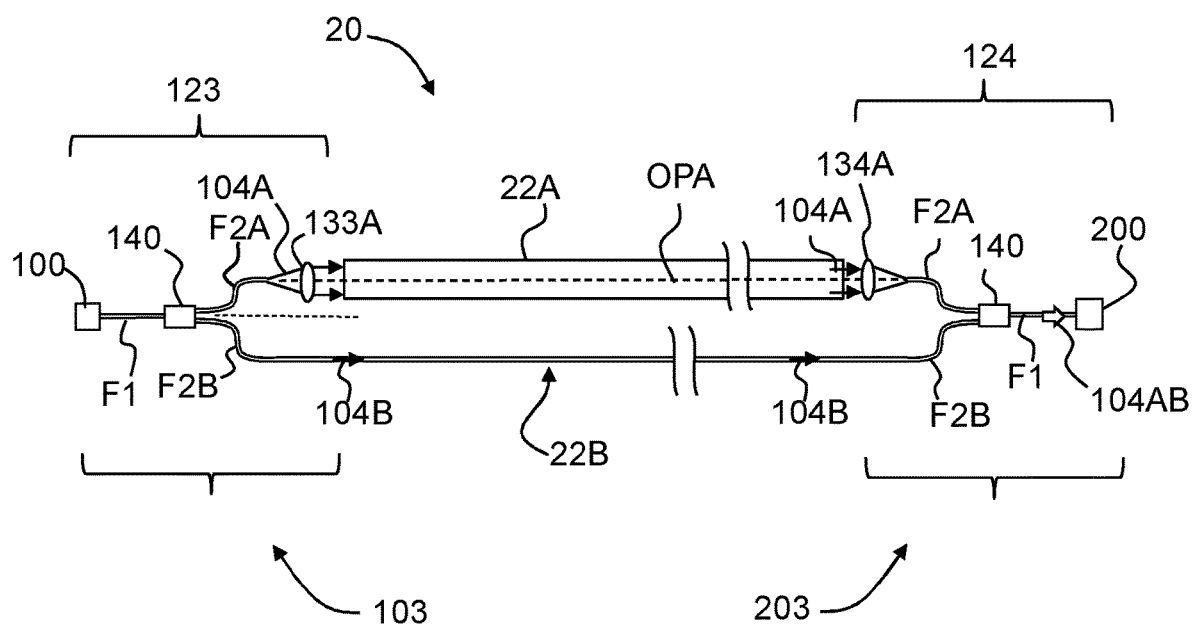

FIG. 8C is similar to FIG. 8B, except that bottom waveguide 22B is in the form of optical fiber section F2B, which now directly connects the two fiber couplers 140 and serves as the second arm of the interferometer.

Aspects of the disclosure include determining the time-evolution of the touch event TE. This can be used for example to determine a relative amount of pressure that is applied to upper surface 26A of top waveguide 22A by, for example, a finger, a stylus, the eraser-end of a pencil, or like implement. In the discussion below, a finger and a stylus with a compressible end are used by way of non-limiting example to describe the pressure-sensing capabilities of touch system 10. Aspects of the disclosure include detecting respective pressures associated multiple touch events, such as when touch system 10 is used in forming a pressure-sensing keyboard, as discussed below. It is noted here that the pressure applied to assembly 30 at top waveguide 22A may be through another surface that resides atop surface 26A, such as a coating layer.

Figure 9A:
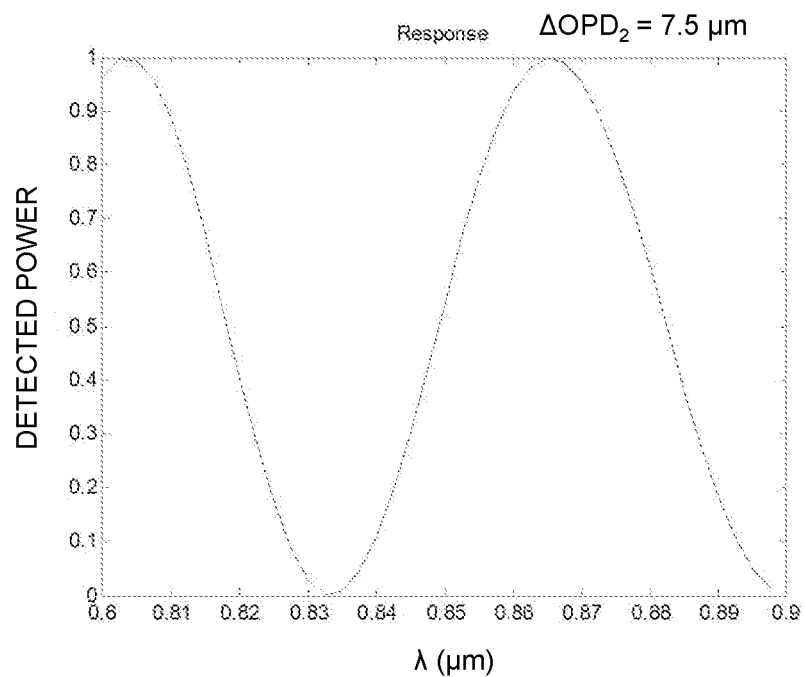
FIGS. 9A and 9B are plots of the operating wavelength $\lambda$ ($\mu$m) vs. (normalized) detected power as a function of the change in the optical paths $\Delta OPD_2$ for the top and bottom waveguides as can occur due to a touch event, wherein for FIG. 9A, $\Delta OPD_2 = 7.5$ $\mu$m and for FIG. 9B, $\Delta OPD_2 = 15$ $\mu$m.
Figure 9B:
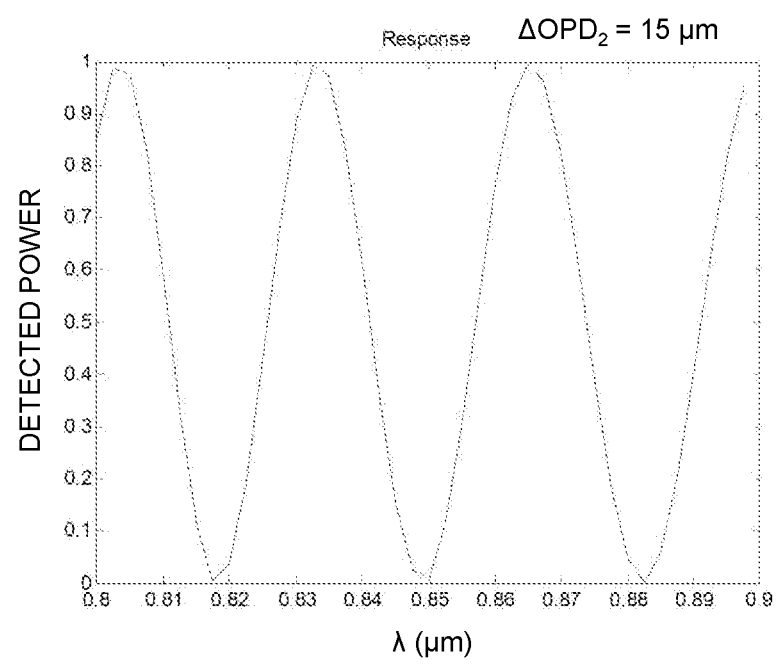

FIGS. 9A and 9B are plots of wavelength λ vs. detector optical power ("power") in normalized units in the case where the optical path difference $\Delta OPD_2$ between the top and bottom waveguides is 7.5 µm and 15 µm, respectively. It can be seen from FIGS. 9A and 9B that the detector signal SD from detector 200 can vary as a sine wave that changes frequency as the optical path difference $\Delta OPD_2$ increases. Thus, by monitoring the change in frequency of detector signals SD, one can determine the time-evolution of the deflection in assembly 20 due to a touch event. This time-evolution of the touch event can be used to assess the amount of pressure vs. time being applied to the touch location TL. It can also be used to sense multiple touches in succession, i.e., a double-tap.

In an example embodiment, light source 100 is wavelength modulated via processor 302 of controller 300 via light source control signal SL (see FIG. 1). This causes a change in interfered light beam 104AB by changing the optical paths OPA and OPB of light beams 104A and 104B in a select manner. This select change manifests itself in detector signal SD, which is processed (filtered) by controller 300 to bring out the laser modulation frequency. This can be accomplished, for example, by a lock-in amplifier.

Thus, in an example embodiment, the time evolution of the processed detector signal SD is used to characterize the time evolution of touch event TE. For example, as an object (e.g., finger 50, stylus, etc.) initially contacts surface 26A of top waveguide 22A, a small amount of flexing of the transparent sheet occurs. As finger F continues to push into top waveguide 22A, the amount of flexing of the top waveguide changes, so that optical path length difference $OPD_2$ continuously changes. The changing optical path lengths show up as a continuous change in the processed detector signal SD.

Once the object applies a constant pressure at touch location TL, the processed detector signal SD stops changing. At this point, the amount of time that the processed detector signal SD remains constant can be measured. This information can be used, for example, to carry out a function by requiring the touch event to have associated therewith not only a certain amount of pressure but a select duration as well. Further in the example embodiment, it can be required that the touch event have a select time evolution in pressure that is consistent with say a finger or stylus used to intentionally cause a touch event, as opposed to say an arbitrary object pressing down on the surface 26A of top waveguide 2A and inadvertently triggering a touch event.

Figure 10A:
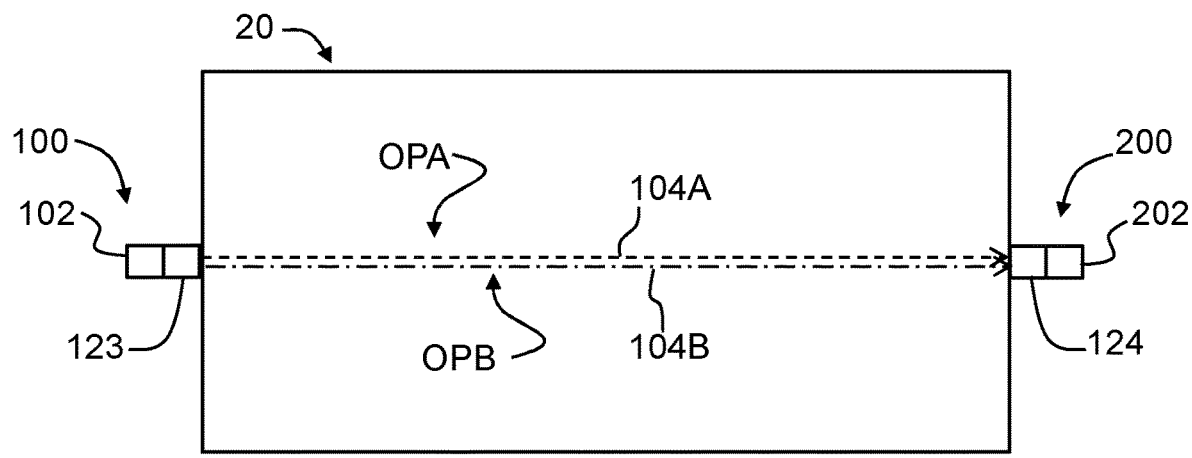
FIG. 10A is a top-down view of an example light-guiding assembly showing light traveling over the different optical paths of the top and bottom waveguides.
Figure 10B:
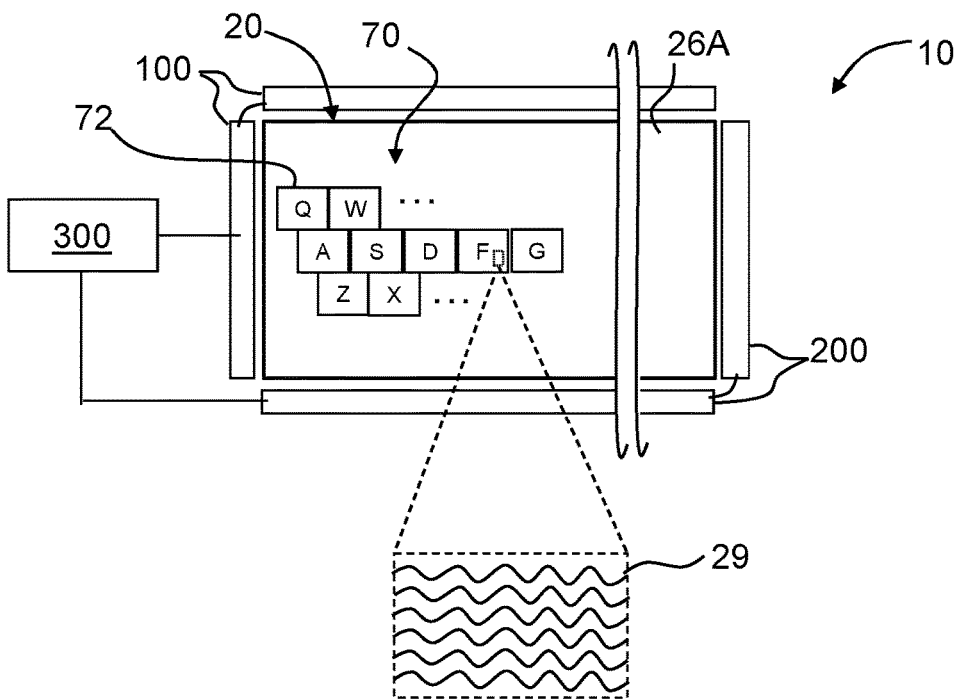
FIG. 10B is a top-down view of an example pressure-sensing touch-screen system in the form of a keyboard, and illustrating regions of surface roughness placed in select locations, such as where the individual keys on the keyboard reside.

FIGS. 10A and 10B are top-down views of system 10, wherein FIG. 10A shows an example where light beams 104A and 104B travel over respective optical paths OPA and OPB from light source 100 to detector 200 in top and bottom waveguides (not shown) of assembly 20. Only a single light source element 102 and detector element 202 are shown in FIG. 10A, while an extended light source and an extended detector 200 are shown in FIG. 10B.

FIG. 10B shows a keyboard 70 that includes indicia denoting for example the usual typing keyboard keys 72. The close-up inset view of key "F" shows that the key area is optionally provided with surface roughness denoted 29 that increases the amount of light scattering for the keys, particularly when they are pressed down upon with a finger to create a touch event. This may be used to illuminate keys 72 using guided light 104A. While guided light 104 travels straight down top waveguide 22A, the light therein interacts with upper surface 26A. If this surface is smooth, then there is very little if any loss from scattering. The introduction of surface roughness 29 will allow guided light 104A to interact with select portions of upper surface 26A and allow some of this light to escape and be visible to a viewer or user of the keyboard.

Fiber-Based Assembly

Figure 11A:
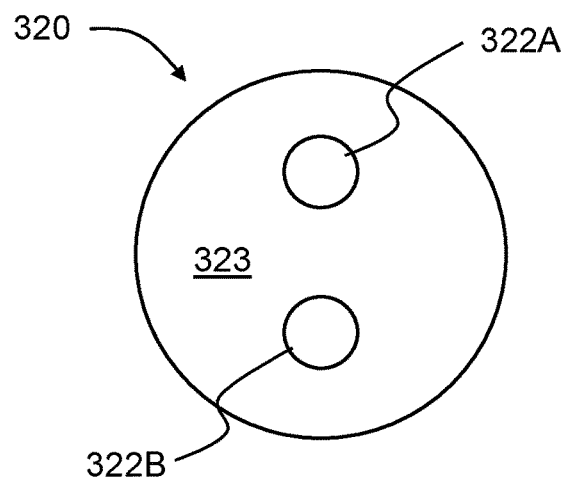
FIG. 11A is a cross-sectional view of an example dual-core optical fiber.
Figure 11B:
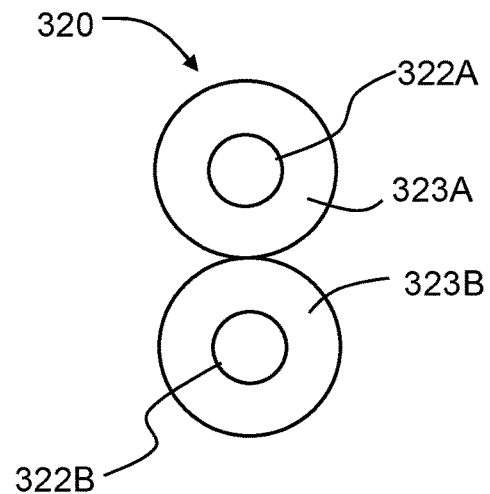
FIG. 11B is a cross-sectional view of an example two-fiber assembly that is analogous to the dual-core optical fiber of FIG. 11A.

FIG. 11A is a cross-sectional view of an example dual-core optical fiber 320 that includes two optical fiber cores 322A and 322B embedded in a cladding 323. FIG. 11B is a cross-sectional view of a fiber assembly 330 that has two optical fibers 320A and 320B disposed adjacent one another and that include respective cores 322A and 322B surrounded by respective claddings 323A and 323B. In an example, cores 322A and 322B are formed such that they support just a single mode at the operating wavelength of the dual-core optical fiber.

Figure 12:
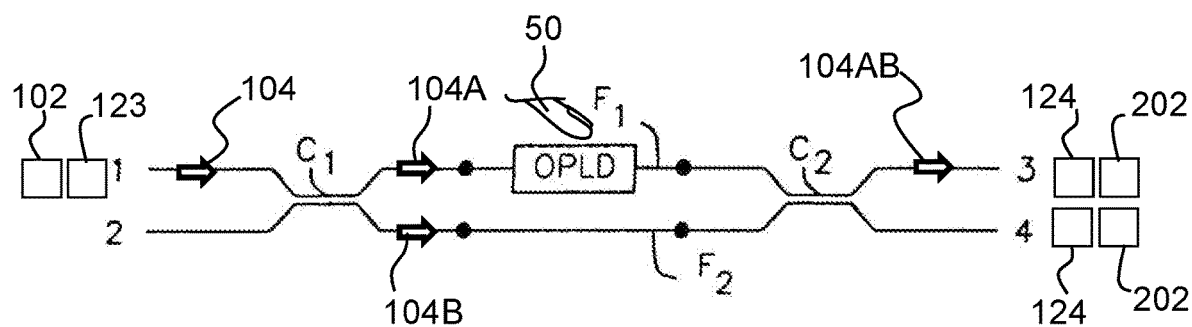
FIG. 12 is a schematic diagram of an example optical-fiber-based Mach-Zehnder interferometer suitable for forming a fiber-based light-guiding assembly, wherein fibers F1 and F2 correspond to top and bottom waveguides.

Optical fibers such as dual-core fiber ("fiber") 320, fiber assembly 300 or like optical fiber configurations can be used to form a Mach-Zehnder interferometer. Examples of such interferometers are disclosed in U.S. Pat. Nos. 5,295,205, 5,943,458, 5,351,325 and 6,862,396. FIG. 12 is taken from FIG. 1 of the '458 patent and illustrates an example fiber-based interferometer that includes a pair of fibers $F_1$ and $F_2$. The fibers are coupled to one another for light transfer therebetween at a first coupler $C_1$ and a second couple $C_2$. The couplers are arranged to transfer light, one fiber to the other. Couplers $C_1$ and $C_2$ may be so-called "evanescent" couplers in which narrowed, elongated portions of the fibers are closely juxtaposed with one another within a matrix or outer coating. The couplers may be 3 dB couplers, arranged to transfer approximately one-half of the optical power supplied on one fiber to the other fiber.

Fibers $F_1$ and $F_2$ have phase-shift regions with different optical path lengths disposed between the couplers. Thus, the optical path length over the phase shift region in fiber $F_1$ is different from the optical path length over the phase shift region in fiber $F_2$. The optical path length difference has been provided either by making the phase shift region of one fiber physically longer than the other, or by making the two fibers $F_1$ and $F_2$ with different propagation constants so that the velocity of light within the two fibers is different. The latter structure can be achieved by making the fibers with different refractive index profiles. Where the fibers are "step-index" fibers, incorporating a core having a relatively high refractive index and a coating with a relatively low refractive index overlying the core, the two fibers may have cores of different refractive indices, different core diameters, different coating refractive indices or some combination of these.

Regardless of the particular mechanism used to produce the optical path length difference, the single stage Mach-Zehnder filter depicted in FIG. 12 will direct light supplied through input 1 either to output 3 or to output 4 depending upon the wavelength of the light. More complex Mach-Zehnder devices utilize multiple stages with multiple phase shift regions and multiple couplers connected in series to achieve certain desirable wavelength-selective characteristics. Still other Mach-Zehnder devices incorporate more than two fibers connected in parallel between the couplers, as described in the aforementioned U.S. Pat. No. 5,351,325. Various optical fibers incorporate different optical path lengths. Desirably, the optical path length differences are selected to provide optical path length differences that are rational or integral multiples of one another. In FIG. 12, "OPLD" can also represent the optical path length difference that arises due to a touch event TE, as explained below.

For Mach-Zehnder devices to provide touch-sensing capability, the path length differences should be as specified and should remain stable except when deliberately altered, such as by a touch event TE. It is noted that in an example embodiment, a light source element 102 (and input optical system 123) is optically coupled into one of input 1 or 2, and detector element 202 (and output optical system 124) is provided at one of output 3 and 4. Alternatively, first and second detector elements 202 and corresponding output optical systems 124 can be placed at outputs 3 and 4 respectively to better detect interfered light 104AB. For example, depending on the phase difference between light beams 104A and 104B, the amount of interfered light 104AB being outputted at ends 3 and 4 can vary, so it can be more accurate to measure the amount of power in both of these output ends to ensure an accurate measurement of the optical path difference $\Delta OPD_2$ caused by a touch event TE.

Figure 13A:
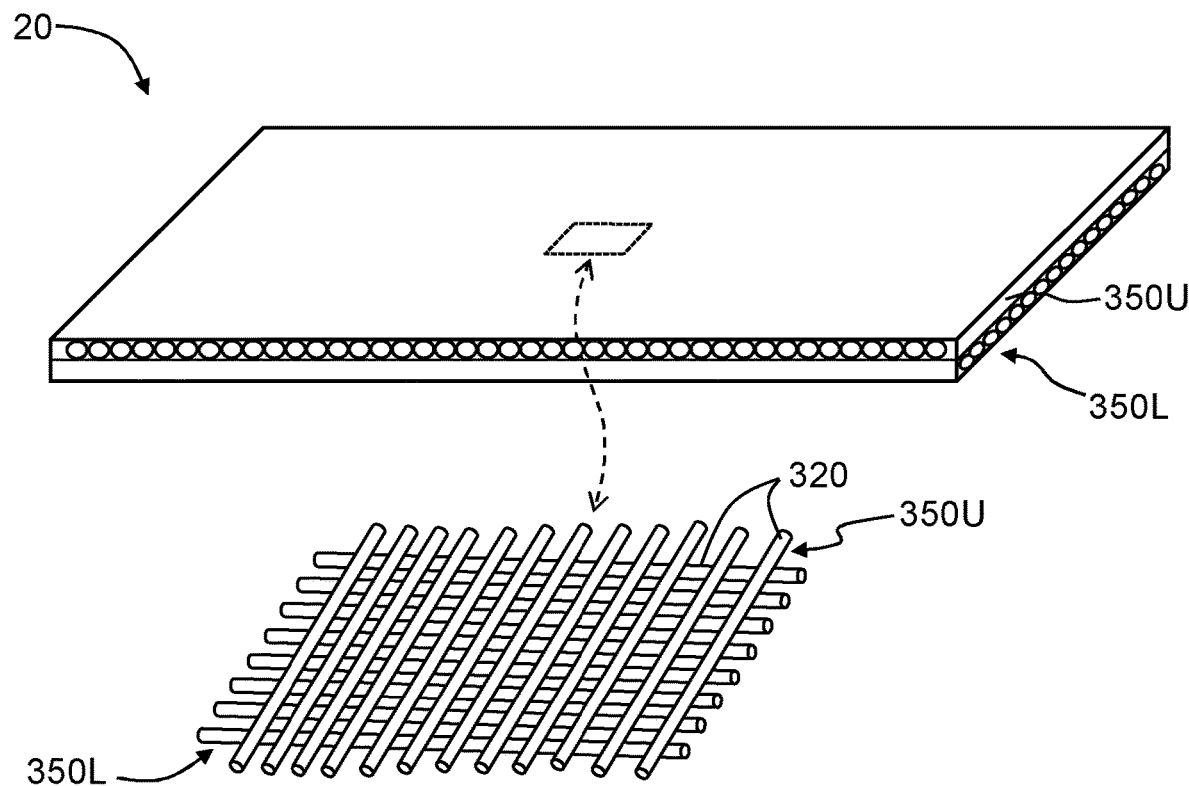
FIG. 13A is an elevated view of an example light-guiding assembly that includes top and bottom arrays of dual-core optical fibers that form a detection grid that enables (x,y) detection of a touch event.

FIG. 13A is an elevated view of an example assembly 20 that includes upper and lower arrays 350U and 350L of optical fibers 320 that form an optical fiber detection grid, as shown in the close-up view. This grid configuration can be used for (x,y) detection of the touch location TL of touch event since at a given touch location, the optical paths differences between cores 322A and 322B will change in relation to their proximity to the touch location. By detecting interfered light 104AB traveling in each dual-core fiber, the (x,y) characteristics of the interference effects can be determined by processing the corresponding detector signals SD.

Figure 13B:
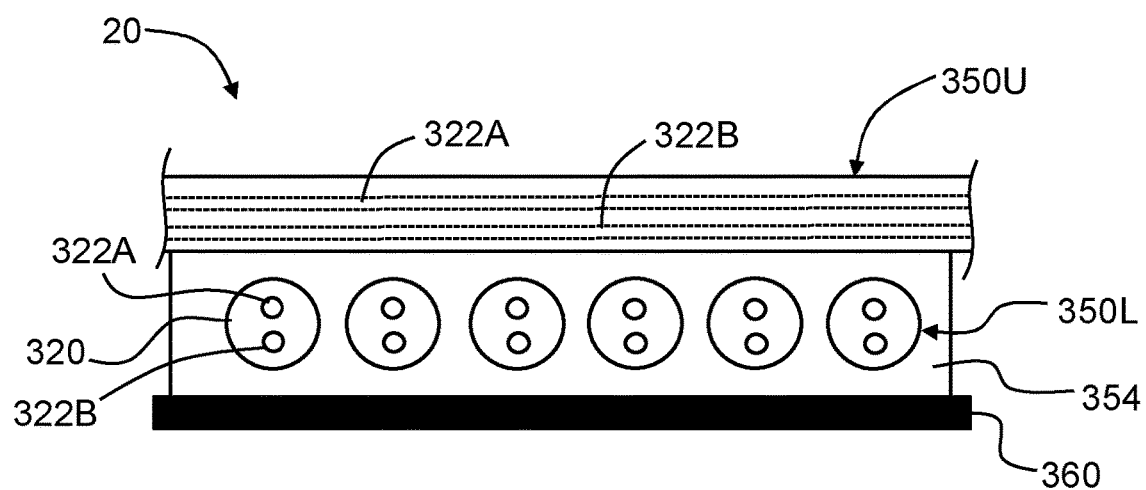
FIG. 13B is a close-up cross-sectional view of an example light-guiding assembly of FIG. 12.

FIG. 13B is a close-up cross-sectional view of the example assembly 20 of FIG. 13A. In an example, upper and lower fiber arrays 350U and 350L are supported in a layer 354 of support material of relatively low elastic modulus such as polyimide, which has an elastic modulus about 20 times less than that of glass. Assembly 20 also includes a substrate 360 that supports the support material 354 and the upper and lower fiber arrays 350U and 350L.

Figure 14A:
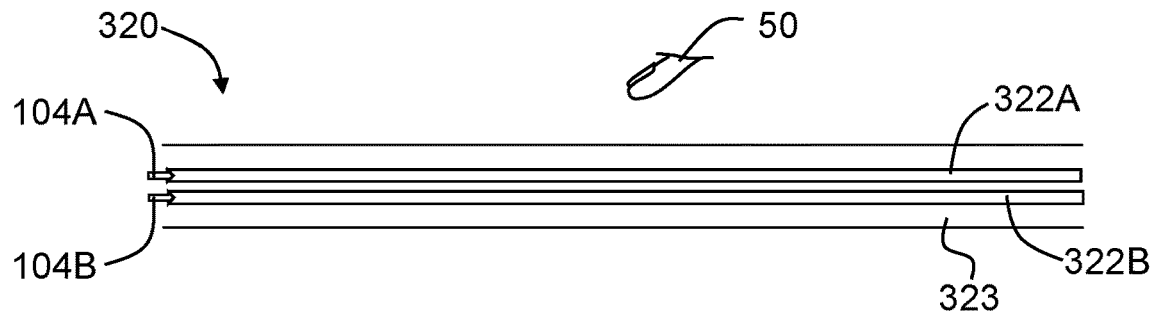
FIGS. 14A through 14C are similar to FIGS. 7A through 7C and illustrate how the flexing of an optical fiber can give rise to an optical path difference between the two cores of the optical fiber and therefore generate interfered light that can be detected at the detector.
Figure 14B:
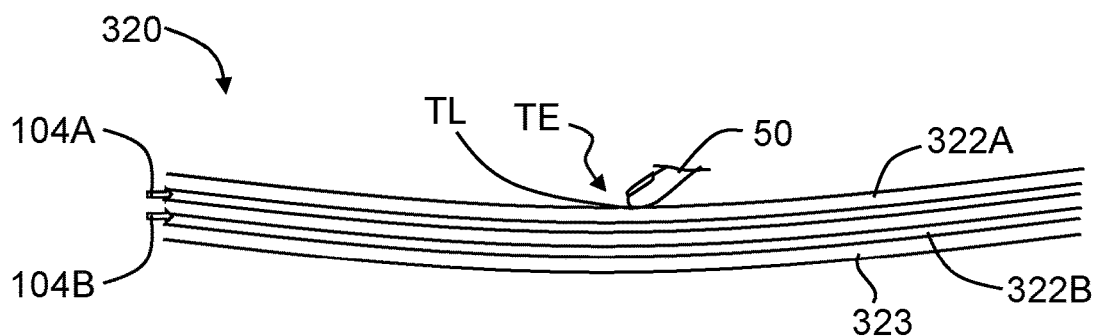

FIG. 14A is a cross-sectional view of one of fibers 320 in upper fiber array 322A, and showing finger 50 just about the fiber. FIG. 14B is similar to FIG. 14A, but shows finger 50 pressing down on fiber 320 to form touch event TE at touch location TL. Because fiber 320 is supported in a manner that allows it to flex as part of the optical fiber grid formed by top and bottom fiber arrays 350T and 350L. Because of the bending of fiber 320, the length of optical paths OPA and OPB for light 104A and 104B traveling in cores 322A and 322B change by different amounts, thereby creating an optical path difference $\Delta OPD_2$ in the same manner as the planar versions of top and bottom waveguides 22A and 22B.

Figure 14C:
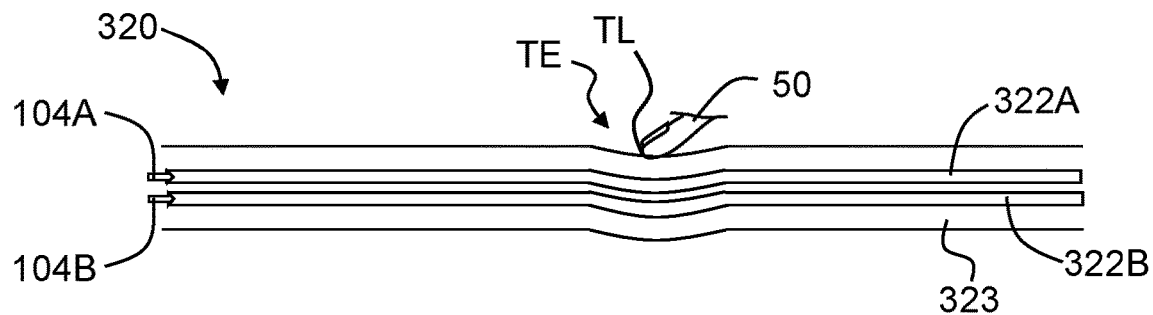

FIG. 14C is similar to FIG. 14B and illustrates an example embodiment where the bending of fiber 320 is more localized at the touch location TL based on the construction of the fiber. For example, fiber 320 may be made of more flexible materials than a conventional dual-core optical fiber.

Display System

Touch system 10 can be used in combination with conventional position-sensing display systems, such as those that are capacitive-based and resistive-based.

FIG. 15A is a schematic elevated view of an example pressure-sensing display 400 formed by operably arranging touch system 10 adjacent and above (e.g., atop) a conventional display unit 410, such as a liquid crystal display, which display may have conventional position-based sensing capability.

FIG. 15B is a schematic cross-sectional, partial exploded view of an example touch-sensitive display 400 illustrating an example of how to integrate touch system 10 with conventional display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a top surface 452, and a top polarizer layer 460 with a top surface 462, all arranged as shown. A frame 470 is disposed around the edge of color filter glass layer 450. Light source 100 is shown by way of example as being operably supported within frame 470. This forms an integrated display assembly 480 having a top side 482.

To form the final touch-sensitive display 400, assembly 20 is added to integrated display assembly 480 of conventional display unit 410 by operably disposing the assembly on top side 482. The assembly 20 can include the aforementioned cover 40 in the form of an IR-transparent but visibly opaque layer disposed adjacent light source 100 and detector 200.

In an example, various indicia or indicium (not shown) such as keyboard 70 (see FIG. 8B) may be presented to user 500 on or through top surface 26A to guide the user to interact with touch system 10. By way of example, the indicium may include areas on top surface 22 of transparent sheet 20 that are set aside for indicating user choices, software execution, etc., or to indicate a region where the user should create touch event TE. Such region, for example, might be required where light 104 does not reach certain portions of top surface 26A.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A touch system for sensing a touch event, comprising:
first and second waveguides that define first and second separate optical paths that change by different amounts by the touch event causing an amount of deformation in at least one of the first and second waveguides;
at least one light source system operably arranged relative to respective input ends of the first and second waveguides and configured to input first and second light beams into the first and second waveguides, respectively; and
at least one detector system operably arranged relative to respective output ends of the first and second waveguides and configured to interfere and detect the first and second light beams and generate a detector signal representative of the amount of deformation in at least one of the first and second waveguides caused by the touch event.

2. The system according to claim 1, further comprising a controller operably coupled to the at least one light source and the at least one detector and configured to receive the detector signal and determine a change in the pressure applied at the touch event location based on the amount of deformation.

3. The system according to claim 2, further comprising the light source being wavelength modulated to form intensity modulated light at the detector.

4. The system according to claim 1, wherein the position of one or more touch events on the planar glass sheet may be determined by the touch system.

5. The system according to claim 4, wherein the pressure applied at the touch event location may be determined based on the amount of deformation.

6. The system according to claim 1, wherein the first and second waveguides are transparent to infrared (IR) light, wherein the emitted light from the at least one light sources comprises IR light, and wherein the at least one detector is configured to detect the IR light.

7. The system of claim 1, wherein the touch event occurs on or immediately adjacent the first waveguide and only the first waveguide undergoes the deformation.

8. The system of claim 1, wherein the light source system comprises at least one light source and at least one input optical system operably arranged between the light source and the input ends of the first and second waveguides.

9. The system of claim 8, wherein the input optical system is configured to receive diverging light from the light source and form collimated light that defines the first and second light beams.

10. The system of claim 9, wherein the input optical system includes an input optical fiber section that is joined to first and second optical fiber sections via an optical fiber coupler.

11. The system of claim 1, wherein the detector source system comprises at least one detector and at least one output optical system operably arranged between the detector and the respective output ends of the first and second waveguides.

12. The system of claim 11, wherein the output optical system is configured to receive collimated first and second light beams from the respective output ends of the first and second waveguides and combine the first and second light beams to form an interfered light beam.

13. The system of claim 12, wherein the input optical system includes an output optical fiber section that is joined to first and second optical fiber sections via an optical fiber coupler.

14. The system according to claim 1, wherein the first and second waveguides are defined by first and second gradient-index regions formed on opposite sides of a transparent glass sheet.

15. A display system that has pressure-sensing capability, comprising:
the pressure-sensing touch-screen according to claim 1; and
a display unit having a display, with the pressure-sensing touch-screen operably arranged adjacent the display.

16. The display system of claim 15, wherein the display unit have a display that includes one of capacitive and resistive touch-sensing capability.

17. A method of sensing a touch event on a touch screen, comprising:
sending first and second light beams through input ends of first and second waveguides that respectively have first and second separate optical paths that define an optical path difference, with the waveguides configured so that the touch event causes a change in the optical path difference;
combining the first and second light beams at output ends of the first and second waveguides to form interfered light; and
detecting the interfered light to generate a detector signal representative of the change in the optical path difference.

18. The method of claim 17, further comprising processing the detector signal to measure a time-evolution of the touch event.

19. The method of claim 17, further comprising determining from the detector signal the amount of pressure applied at a touch location of the touch event.

20. The method of claim 17, further comprising determining from the detector signal the touch location of the touch event.

21. The method of claim 17, wherein the first and second waveguides are defined by first and second gradient-index regions formed on opposite sides of a glass transparent sheet.

22. The method of claim 17, wherein the touch event causes a deformation in at least one of the first and second waveguides, and including detecting the interfered light as a function of time to characterize the time-evolution of the deformation.

23. The method of claim 20, wherein the time-evolution characterization includes determining a relative amount of pressure applied at a location of the touch event.

24. The method of claim 17, further comprising processing the detector signal using a computer having a processor configured to perform signal processing.

25. The method of claim 17, further comprising viewing a display through the first and second waveguides.

26. The method of claim 17, further comprising sensing a touch location of the touch event using at least one of capacitive and resistive touch-sensing.

* * * * *

UNITED STATES PATENT AND TRADEMARK OFFICE
CERTIFICATE OF CORRECTION

PATENT NO. : 10,572,071 B2
APPLICATION NO. : 15/916924
DATED : February 25, 2020
INVENTOR(S) : Ming-Jun Li et al.

It is certified that error appears in the above-identified patent and that said Letters Patent is hereby corrected as shown below:

On the Title Page

Page 2, Column 2, item (56), other publications, Line 5, delete "lnterscience" and insert -- Interscience --, therefor.

Page 2, Column 2, item (56), other publications, Line 6, delete "Sysmetrical Slabe" and insert -- Symmetrical Slab --, therefor.

Signed and Sealed this
Ninth Day of June, 2020

Andrei Iancu
*Director of the United States Patent and Trademark Office*